(12) United States Patent
Jones et al.

(10) Patent No.: US 8,228,657 B2
(45) Date of Patent: Jul. 24, 2012

(54) FREQUENCY-ADDRESSABLE APPARATUS AND METHODS FOR ACTUATION OF LIQUIDS

(75) Inventors: Thomas B. Jones, Rochester, NY (US); Weiqiang Wang, Rochester, NY (US); Adrian G. Bailey, Hants (GB)

(73) Assignee: University of Rochester, Rochester, NY (US)

( * ) Notice: Subject to any disclaimer, the term of this patent is extended or adjusted under 35 U.S.C. 154(b) by 1156 days.

(21) Appl. No.: 12/015,167

(22) Filed: Jan. 16, 2008

(65) Prior Publication Data

US 2008/0169195 A1   Jul. 17, 2008

Related U.S. Application Data

(60) Provisional application No. 60/885,277, filed on Jan. 17, 2007, provisional application No. 60/917,133, filed on May 10, 2007.

(51) Int. Cl.
*H01T 23/00* (2006.01)
(52) U.S. Cl. ...................................................... 361/230
(58) Field of Classification Search .................. 361/230
See application file for complete search history.

(56) References Cited

U.S. PATENT DOCUMENTS

| 5,441,639 A * | 8/1995 | Noble et al. ................... 210/243 |
| 7,931,811 B2 * | 4/2011 | Ruan et al. ................ 210/748.01 |
| 2006/0108224 A1 | 5/2006 | King et al. |
| 2006/0114296 A1 | 6/2006 | Gascoyne et al. |
| 2006/0226012 A1 | 10/2006 | Kanagasabapathi et al. |

OTHER PUBLICATIONS

T.B. Jones; "Dynamics of dielectrophoretic Liquid Microactuation"; Department of Eclectrical & Computer Engineering, University of Rochester, NY 14627 (USA).

(Continued)

*Primary Examiner* — Stephen W Jackson
(74) *Attorney, Agent, or Firm* — William Greener; Bond, Schoeneck & King, PLLC

(57) ABSTRACT

Embodiments of the invention are directed to apparatus, methods, and applications involving the actuation of a semi-insulative working fluid by electromechanical forces based on electrowetting-on-dielectric (EWOD) and liquid dielectrophoresis (liquid DEP) mechanisms that are controlled by the frequency, but not the magnitude, of an AC voltage (i.e., 'frequency-addressable). In the various apparatus embodiments of the invention, a single, frequency-addressable electrode pair includes at least one electrode that has a spatially-varying dielectric coating thickness and thus a spatially-varying electrode gap wherein at least a portion of which a volume of a working fluid can stably reside under no influence of an applied voltage. In an exemplary aspect, a frequency-addressable, bistable apparatus includes at least one wider gap and one narrower gap associated, respectively, with a thicker and a thinner dielectric coating thickness of the electrode(s). The working fluid resides in only one of the at least two gap regions only under the influence of capillary force. A brief burst of AC voltage at a selected high frequency or low frequency will move the liquid from one gap region to another (and back) by one of an EWOD-based and a DEP-based force. In an alternative aspect, an analog apparatus has a continuous, spatially-varying electrode gap in which the dielectric coating thickness on the electrodes varies smoothly in an inverse manner. Various applications to a display device, fiber optic coupler and attenuator, controlled liquid volume dispensers, spotting arrays, well plate apparatus, and others are presented, along with control methods.

94 Claims, 34 Drawing Sheets

OTHER PUBLICATIONS

Thomas B. Jones; "DEP Microactuation & Droplet Dispensing"; University of Rochester ECE Home Page (http://www.ece.rochester.edu/~jones/); 1970; MA Institute of Technology.

Thomas B. Jones; "Hydrostatics and steady dynamics of spatially varying electromechanical flow structures"; Journal of Applied Physics, vol. 45, No. 4, Apr. 1974.

Thomas B. Jones; "On the Relationship of Dielectrophoresis and Electrowetting"; Langmuir, vol. 18, No. 11, 2002, pp. 4437-4443.

Thibault Roques-Carmes, Robert A. Hayes, B.J. Feenstra, J.M. Schlangen; "Liquid behavior iside a reflective display . . . "; Journal of Applied Physics; vol. 95, No. 8, Apr. 15, 2004.

K-L Wang, T.B. Jones; "Frequency-dependent bifurcation in electromechanical microfluidic structures"; Journal of Micromechanics and Microengineering, 14 (2004) 761-768.

T.B. Jones; "An electromechanical interpretation of electrowetting"; Journal of Micromechanics and Microengineering; 15 (2005) 1184-1187.

Lee W. Young; Patent Cooperation Treaty PCT International Search Report; PCT Written Opinion of the International Searching Authority; Jul. 14, 2008.

* cited by examiner

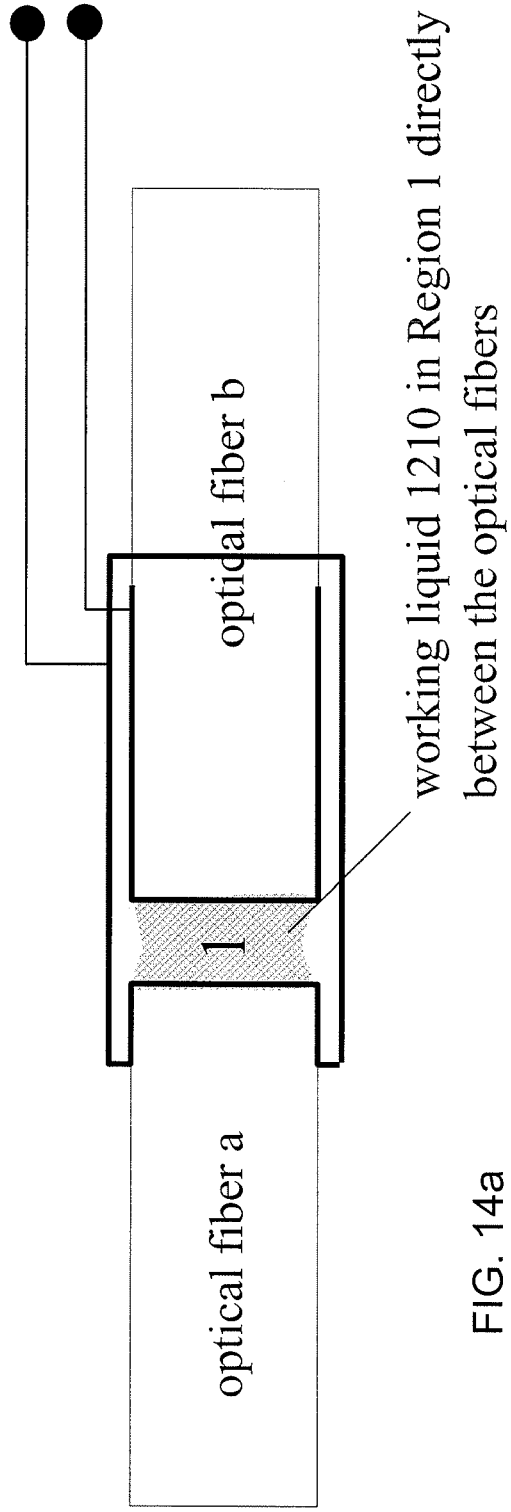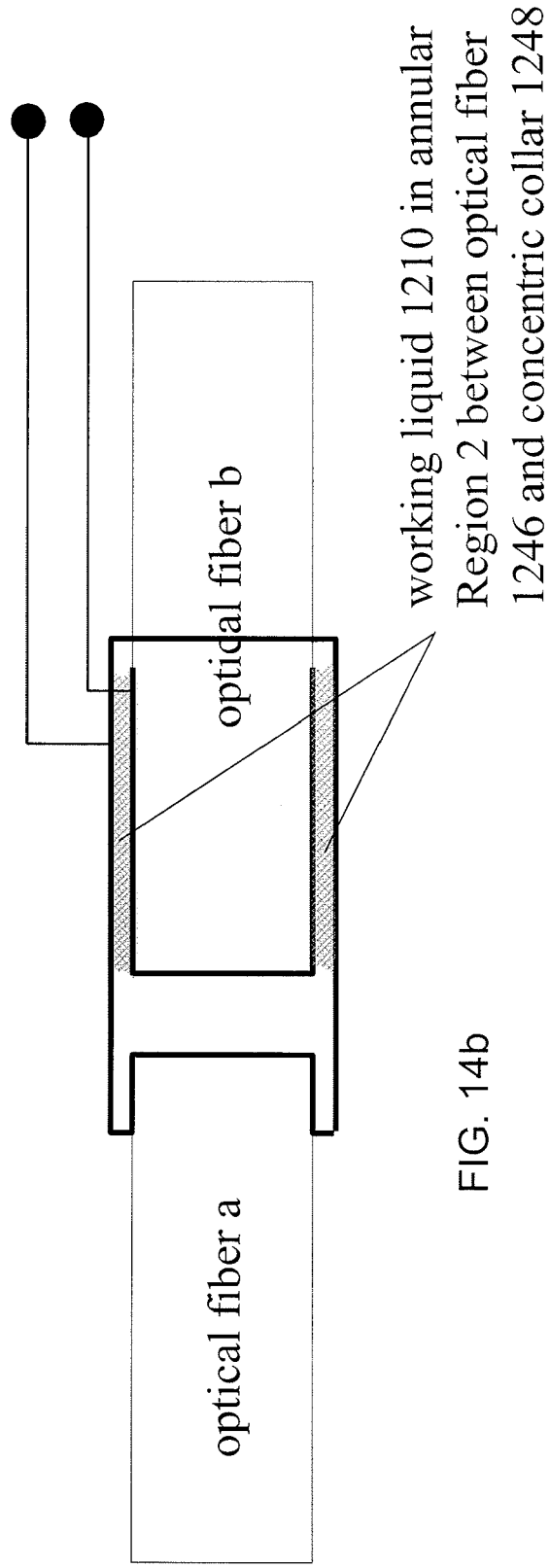

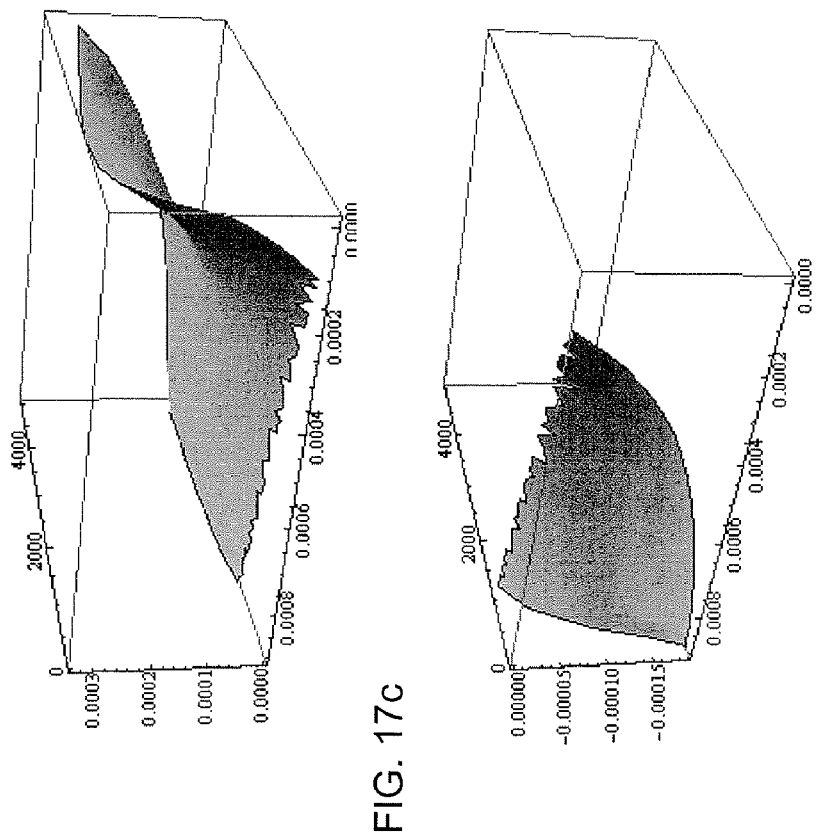
FIG. 17c
FIG. 17d
$Vol = 120\%; x \leq 0.9*L_1; 50 < f < 5$ kHz
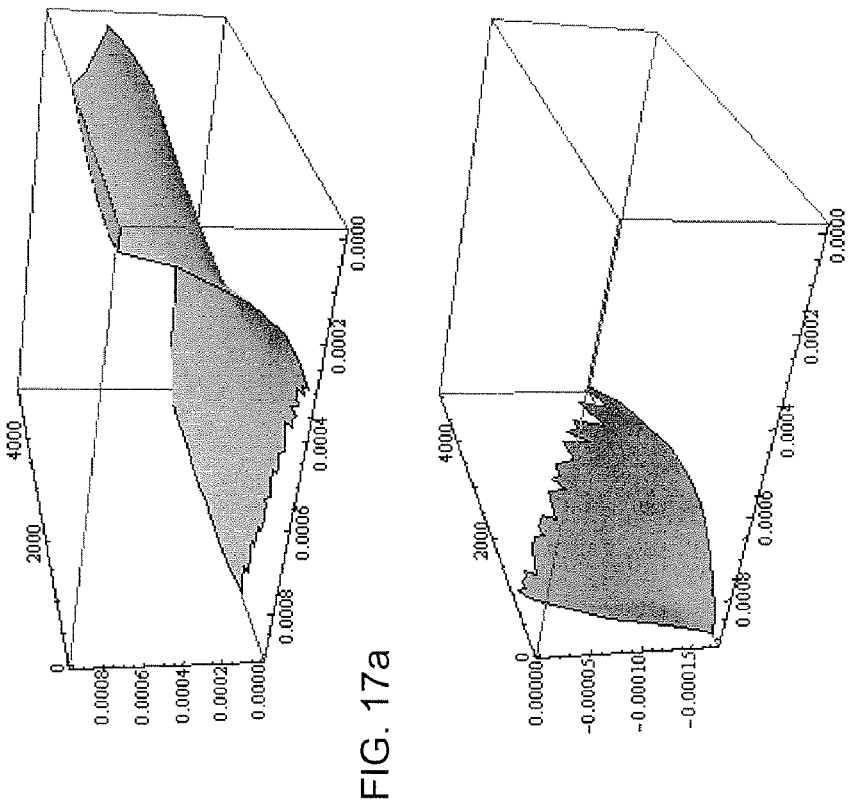
FIG. 17a
FIG. 17b
$Vol = 100\%; x \leq 0.9*L_1; 50 < f < 5$ kHz

| liquid volume $Vol$ (%) | threshold $x$ $(x/L_1)$ |
|---|---|
| 100 | 0.312 |
| 110 | 0.212 |
| 120 | 0.112 |
| 130 | 0.012 |
| 131.2 | 0 |
| 140 | 0 |

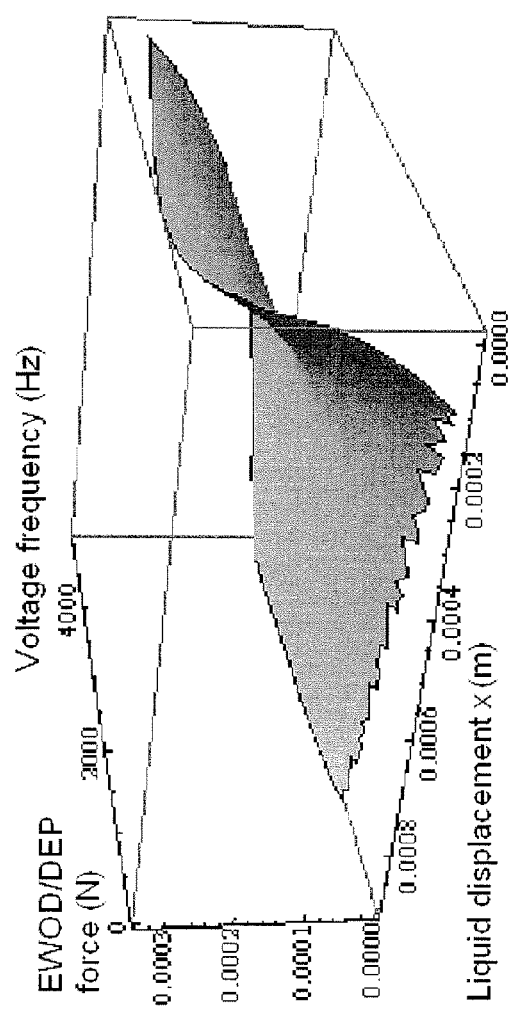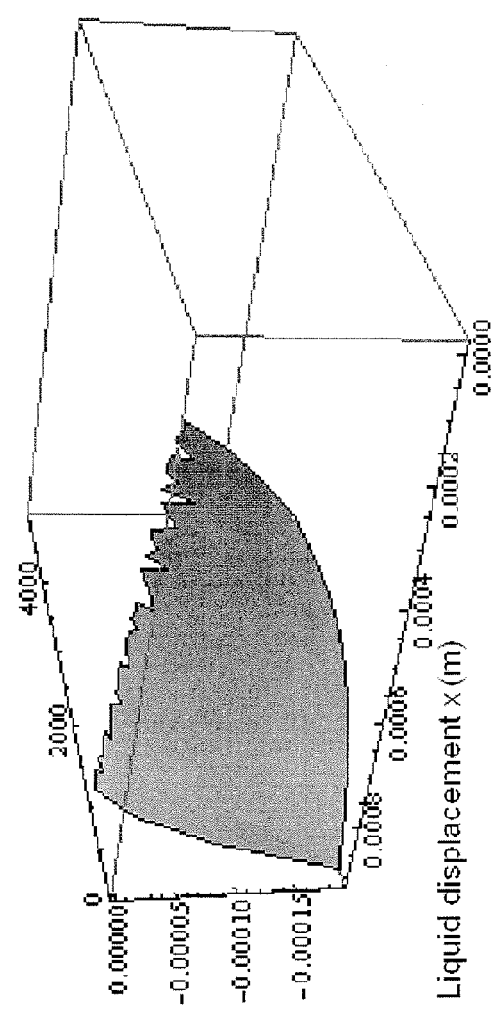

$C_o = 3*10^{-11}$ F

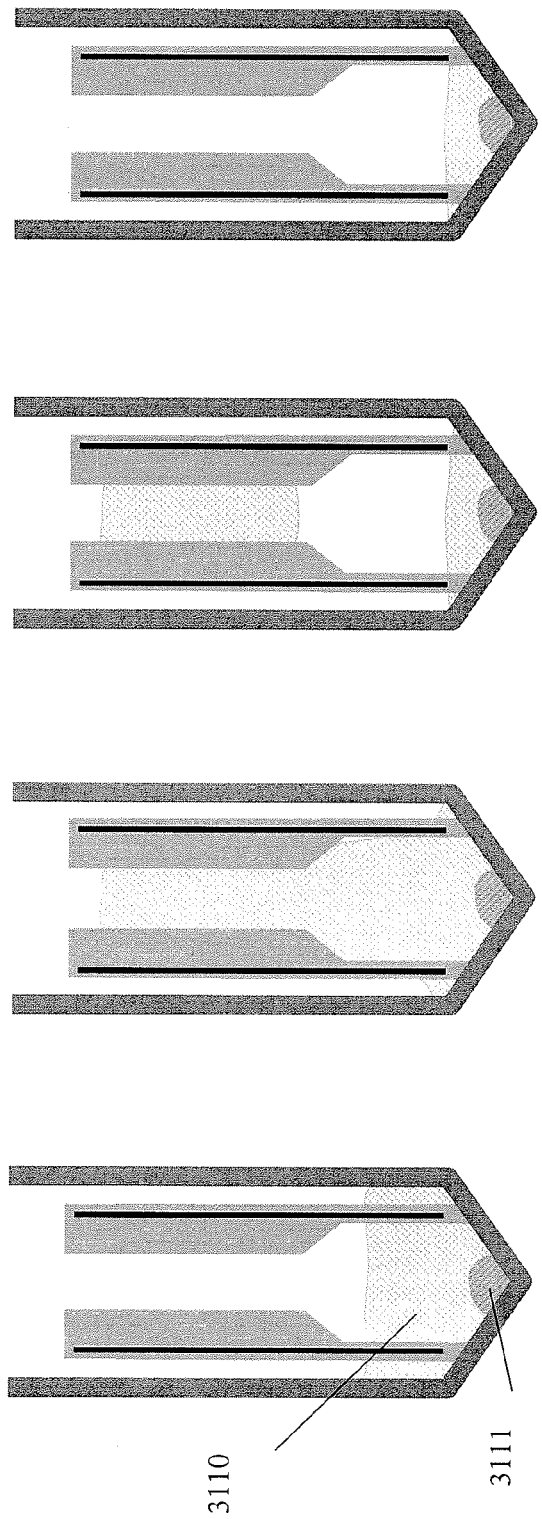

FREQUENCY-ADDRESSABLE APPARATUS AND METHODS FOR ACTUATION OF LIQUIDS

RELATED APPLICATION DATA

This application claims priority to U.S. provisional application Ser. No. 60/885,277 filed on Jan. 17, 2007 and to U.S. provisional application Ser. No. 60/917,133 filed on May 10, 2007, the subject matters of which are incorporated by reference herein in their entireties.

FEDERALLY SPONSORED RESEARCH

Not applicable.

BACKGROUND

1. Field of the Invention

Embodiments of the invention are most generally related to the field of fluid (liquid) electromechanics and to the generation and application of frequency-addressable electromechanical forces and their controllable effects on working fluids. More particularly, embodiments of the invention are directed to both bistable and analog (continuous) microfluidic devices and working fluid actuation methods based on the generation and application of frequency-addressable electrowetting-on-dielectric (hereinafter "EWOD")- and liquid dielectrophoresis (hereinafter "DEP")-based forces.

2. Description of Related Art

The underlying theory and application of an electric field to control the motion of a dielectric media have been known for some time. More than 100 years ago, Pellat demonstrated that a non-uniform electric field could dramatically influence the hydrostatic equilibrium of a dielectric liquid. Pohl originally used the term "dielectrophoresis" (DEP) to describe the phenomenon in which a force is exerted on a dielectric particle when it is subjected to a non-uniform electric field. At one time, the U.S. space program explored various ways to utilize the basic force mechanisms discovered by Pellat to manage and control propellants and other liquids in zero-gravity applications. Thereafter, the term "liquid dielectrophoresis" was used to refer to the behavior of liquids subjected to non-uniform electric fields analogous to the particle behavior described by Pohl. The interested reader is directed, for example, to H. A. Pohl, *The Motion and Precipitation of Suspensoids in Divergent Electric Fields*, J. Appl. Phys. 22(7), 869-871 (1951); Pohl, H. A., *Some effects of nonuniform fields on dielectrics*, J. Appl. Phys., 29(8), 1182-1188 (1958); Pohl, H. A., *Dielectrophoresis behavior of neutral matter in nonuniform electric fields*, Cambridge University Press. Cambridge (1978); and Jones, T. B., *On the Relationship of Dielectrophoresis and Electrowetting*, Langmuir 2002, 18, 4437-4443, and the references cited therein. More recently, for example, a method was described for control of a liquid by an electric field that utilized the non-uniform electric field created by dielectric-coated, planar electrodes patterned on insulating substrates to control and manipulate sessile droplets and small volumes of aqueous liquid. Exemplary schemes included dielectrophoretic (DEP) actuation and the electrowetting-on-dielectric (EWOD) effect. (See, e.g., Wang, K-L and Jones, T. B., *Frequency-dependent bifurcation in electromechanical microfluidic structures*, J. Micromech. Microeng., 14, 761-768 (2004) and the references cited therein, the subject matter of which is incorporated herein by reference in its entirety to the fullest allowable extent). EWOD involves modifying the wetting properties of a solid material via an applied voltage. It has become a widely used tool for manipulating tiny amounts of liquids on surfaces.

In addition to the space program applications mentioned above, DEP- and/or EWOD-based mechanisms have been employed in various other technologies including, but not limited to, display systems and digital microfluidics.

Display systems, for example, are omnipresent. Televisions, portable computers, cell phones and flash drive-based media players are but a few examples of electronic devices that incorporate display technology. The use of various devices in all kinds of environments places high demands on the quality of images produced by image display devices. Consumers demand high brightness and contrast, good resolution, wide angle viewing, light weight, fashionable and ergonomic styling, economic value, and other attributes.

The term 'electronic paper' represents a contemporaneous display technology, usually operating in the reflective mode. In the 1990s, electronic paper based on the electrophoretic motion of particles inside small capsules was demonstrated and later commercialized. One drawback of these systems is their slow response speed, which was controlled by the velocity of the particles.

Electrowetting has more recently been demonstrated as a basis of reflective/transmissive display applications for video and other data formats. In display applications, electrowetting can be used to manipulate colored, liquid-based compositions in enclosed membranes to facilitate pixel-based imaging. Improvements in response time over electrophoretic-based applications, as well as published accounts of brightness and color attributes have been reported in the literature.

Despite the attractive results that are being reported with electrowetting-based reflective/transmissive display technology, improvements are still being sought. For example, a continuous application of voltage is required to maintain an "ON" state, thus an image is maintained only as long as voltage is applied to the pixels that are to remain transparent. Electrowetting-based displays therefore are not truly bistable, do not have inherent storage capability, and require external circuitry for image maintenance and refreshment.

In the burgeoning field of microfluidics, improved methods and apparatus for manipulating, mixing, separating, delivering, analyzing, and otherwise actuating small liquid samples, that are more efficient, lighter, less expensive, disposable, and otherwise improved over current implementations, are constantly being sought. Similarly, the fields of photonics and fiber-optical communications continue to benefit from improvements in control mechanisms that are more reliable, more responsive, easier to implement, less expensive, and otherwise improved over existing technological solutions. Previously, structures required individually-addressable electrodes and changes in voltage to manipulate fluids from one region of the structure to another. These systems are burdensome and electrically complex. The inventors recognized the advantages and benefits of systems that reduced this complexity and the associated costs and other inefficiencies associated therewith.

The advantages and benefits provided by the teachings disclosed herein and the embodiments of the invention disclosed and claimed will become more apparent to persons skilled in the art in view of the following description and drawings.

SUMMARY

The embodiments of the instant invention are directed to apparatus and methods that manipulate electromechanical forces to actuate a liquid (working fluid) media. As used herein, the term electrowetting-on-dielectric (EWOD) will be used to refer to the mechanism of the low-frequency dependence of the electromechanical force exerted on a semi-insulative liquid disposed between a pair of dielectric-coated electrodes, within a set of defined parameters. In conjunction therewith, the term (liquid) dielectrophoresis (DEP) will be used to refer to the mechanism of the high-frequency dependence of the electromechanical force exerted on a semi-insulative liquid disposed between a pair of dielectric-coated electrodes, also within the set of defined parameters. The electromechanical force, of which both magnitude and sign can be controlled by AC voltage-independent frequency control, which shall be referred to herein as "frequency-addressable", is exploited to move small working fluid masses back and forth in spatially-varying electrode structures of various designs and possessing multiple, stable hydrostatic equilibria via capillary forces. The frequency-addressable equilibria are engineered into the electrode structure by appropriate spatial variation of the electrode gap spacing where the liquid resides and the corresponding thickness of the dielectric coatings on the electrodes. In addition, suitable parametric ranges of the dielectric constant and electrical conductivity of the working fluid and the dielectric coating are described.

One set of embodiments of the invention are directed to frequency-addressable, bistable, fluid-actuation apparatus and an associated fluid control method. In general, the bistable apparatus embodiments include at least two connected, but differently dimensioned, electrode gap regions forming working fluid compartments of roughly equal volume. A semi-insulative, working fluid will reside in static equilibrium almost entirely within one or the other of these two compartments via capillary force. Either of the compartments can be sub-divided but all remain contiguous with one another. The two hydrostatic configurations (states) of the bistable apparatus are independent equilibria maintained by capillary forces and liquid/solid wetting with no assist from an electric field. The electric field is used only to shuttle the working fluid between the two compartments by application of brief tone bursts of AC voltage at one or the other of two specified frequencies relating to the EWOD mechanism and the liquid-DEP mechanism.

According to various aspects of these embodiments, the apparatus includes a structural component of various designs and/or geometries depending upon the application that includes a pair of dielectric-coated electrodes, at least two connected compartments (referred to herein as gap regions or fluid wells) having substantially equal volumes defined by the gap spacing between the dielectric-coated electrodes, a multiple-frequency AC voltage source operatively coupled to the electrodes, and, optionally, a programmable controller coupled to the multiple-frequency AC voltage source for individually addressing the electrode pairs. When a working fluid of appropriate volume occupies one of the compartments, a brief tone burst of AC voltage at either of two distinct frequencies can be used to move the working fluid back and forth between the two compartments. Equilibrium in either state is maintained by capillarity without applied voltage, that is, until the state is changed (addressed) by application of a new AC voltage tone burst at the other frequency. According to various aspects, the bistable behavior of this embodiment can be applied to pixel-based display components, fiber optic components, microfluidic volume dispensers, well plates, aliquot spotting systems used in liquid-based biochemical or microbiological protocols, and others that will be appreciated by those skilled in the art. According to an aspect, the embodied apparatus will rely on a difference in the thicknesses of the dielectric layers coating the electrodes and the spatially-varying inter-electrode spacing (gap thickness) to effect the desired frequency-addressed actuation. According to an alternative aspect, one of the electrode components is segmented or split so that the two parts are separately, electrically addressable, the dielectric coating on the split electrodes has a substantially uniform thickness, and an external capacitor is added in series with one of the segmented electrode sections.

Another set of embodiments of the invention are directed to a frequency-addressable, analog, fluid-actuation apparatus and associated fluid-actuation control methods. In general, in the analog scheme, the semi-insulative working fluid is contained in the gap between coated electrodes. For continuous analog liquid positioning, the gap spacing D(x) and the thickness of the dielectric coating on the electrodes d(x) vary relatively smoothly, in an inverse manner, and in accordance with a specifically designed profile. Hydrostatic equilibrium is established at the balance point where the net electromechanical force acting on the working fluid mass is zero. Because this balance point is essentially frequency-dependent only (i.e., not dependent on voltage magnitude), positional control is achieved by adjusting the frequency. AC voltage will typically need to be applied continuously in order to maintain the equilibrium and liquid position, although the duty cycle and/or voltage magnitude may be decreased without loss of function once the liquid mass reaches the equilibrium state.

This set of embodiments employs a smooth (rather than abrupt) variation of the electrode gap spacing and dielectric coating thickness to achieve frequency-controlled micropositioning of a working fluid mass. Exemplary apparatus include liquid dispenser devices, continuously-adjustable electrooptic attenuators, well plates, and others that will be appreciated by those skilled in the art.

Other embodiments described below include a tri-stable apparatus and control method and various application apparatus of the bistable and/or analog embodiments.

For all of the embodiments disclosed herein, the wider gap region $D_1$ will be in the range between about 250μ to about 800μ; the narrower gap region $D_2$ will be in the range between about 50μ to about 100μ; the thinner dielectric coating $d_1$ associated with the wider gap region $D_1$ will be in the range between about 0.3μ to about 1μ; and, the thicker dielectric coating $d_2$ associated with the narrower gap region $D_2$ will be in the range between about 1μ to about 10μ.

Embodiments of the invention will now be described in detail with reference to the attached drawings and as defined by the appended claims.

BRIEF DESCRIPTIONS OF THE DRAWINGS

FIGS. 14(a, b) are side cross sectional schematic views of the frequency-addressable, bistable, fluid-actuation structure illustrated in FIG. 12 according to an illustrative embodiment of the invention;

FIGS. 17(a-d) show 3D plots that describe the force sign transition for two different values of the captive liquid inventory according to the exemplary embodiment illustrated in FIG. 15;

FIGS. 31(a-d) are side cross sectional schematic views of a frequency-addressable smart well plate for use in illustrating the operational steps according to an exemplary method embodiment of the invention.

DETAILED DESCRIPTION OF EMBODIMENTS OF THE INVENTION

Figure 1:
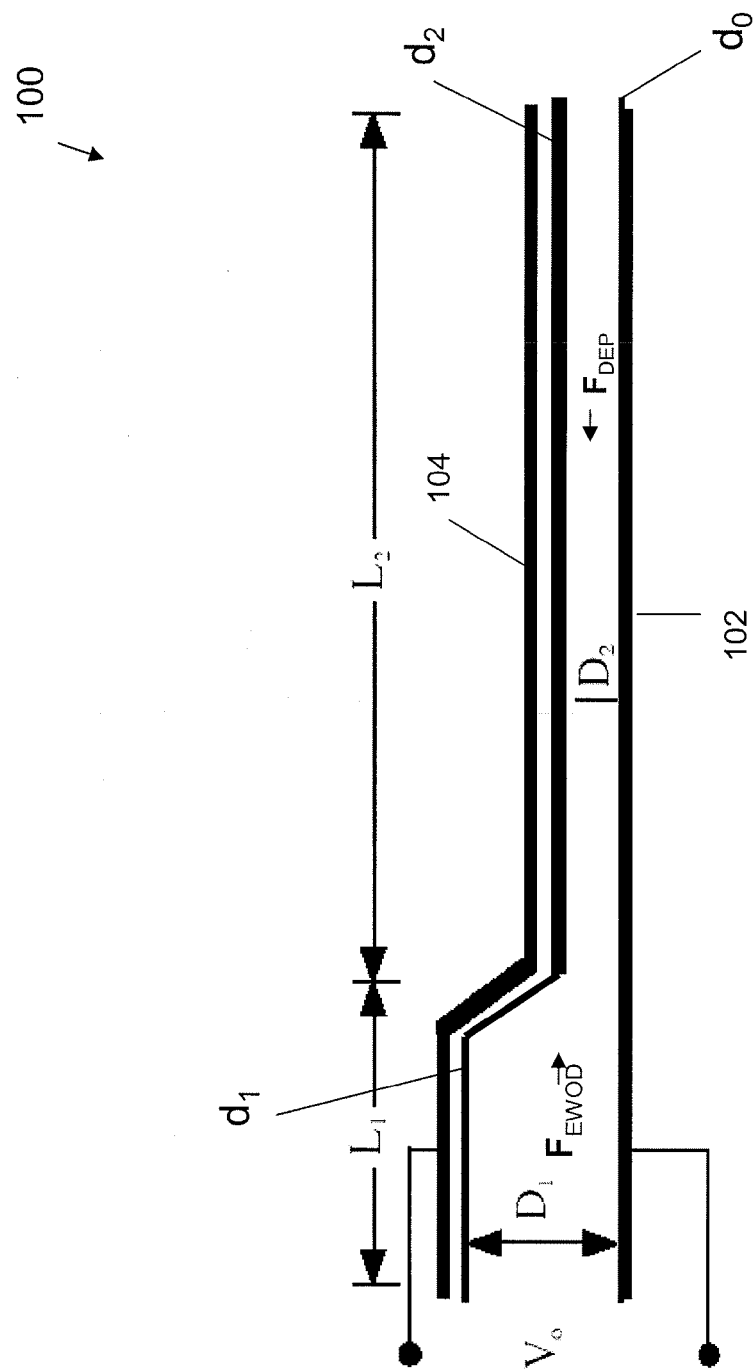
FIG. 1 is a side cross sectional schematic view of a frequency-addressable, bistable, fluid-actuation structure (without a working fluid mass) according to an illustrative embodiment of the invention.

FIG. 1 shows a cross sectional schematic view of a bistable, frequency-addressable apparatus 100 (without a working fluid mass) according to an illustrative embodiment of the invention to assist the reader in understanding the frequency-dependent (voltage-independent) actuation principle. As shown, a continuous bottom electrode 102 has a thin dielectric coating of thickness $d_0$. The upper electrode 104 has a dielectric coating of thickness $d_1$ over a length $L_1$ of electrode 104 forming an electrode (fluid) gap (and thus a first compartment having a volume $V_1$) of thickness $D_1$, and a dielectric coating of thickness $d_2$ over a length $L_2$ of electrode 104 forming an electrode (fluid) gap (and thus a second compartment having a volume $V_2$) of thickness $D_2$, wherein $d_0 < d_1, d_2$; $d_1 << d_2$; $D_1 >> D_2$; $L_1 < L_2$; and $V_1 \sim V_2$. As used herein, frequency-addressable actuation means that an achievable reversal of, e.g., an EWOD-based force, $F_{EWOD}$, acting from left to right (+x), and a reversal of a DEP-based force, $F_{DEP}$, acting from right to left (-x), can be achieved merely by adjusting the frequency of the applied AC voltage, with no need either to adjust the voltage magnitude or to switch voltages between different sets of electrodes. The known mechanism making this liquid manipulation and control possible is the frequency-dependent nature of the electromechanical force acting on the working fluid itself. The parameters of the working fluid, device geometries, and profiles of the thicknesses of the dielectric layer on at least one of the electrodes, will be discussed in detail below. However, the various gaps, $D_1$, $D_2$, and thicknesses, $d_1$, $d_2$, of the structure will advantageously be selected so that (a) the transition frequency (i.e., the frequency at which force reversal occurs) is in a range convenient for conventional electronics (e.g., ~100 Hz to ~2 kHz) and (b) the absolute magnitudes of the +x and −x-directed forces, at, respectively, high and low frequencies, are approximately equal. This second criterion (b) provides that the response times of the device will be reasonably in balance; a beneficial constraint for application in a display device, for example.

The frequency-dependent force mechanism is further explained below with reference to the schematic structure 200 in FIG. 2a and the equivalent RC circuit model 250 shown in FIG. 2b.

Figure 2A:
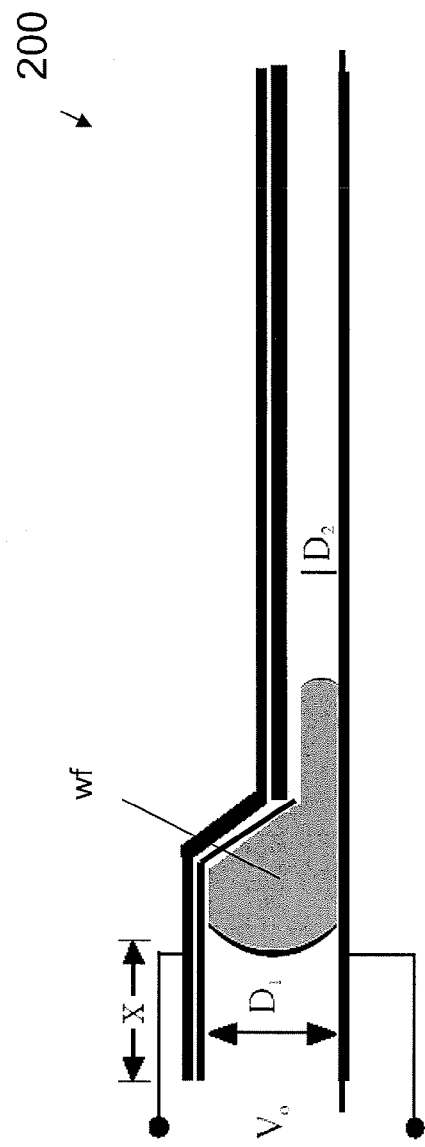
FIG. 2a is a side cross sectional schematic view of a frequency-addressable, bistable, fluid-actuation structure (with a working fluid mass) according to an illustrative embodiment of the invention.
Figure 2B:
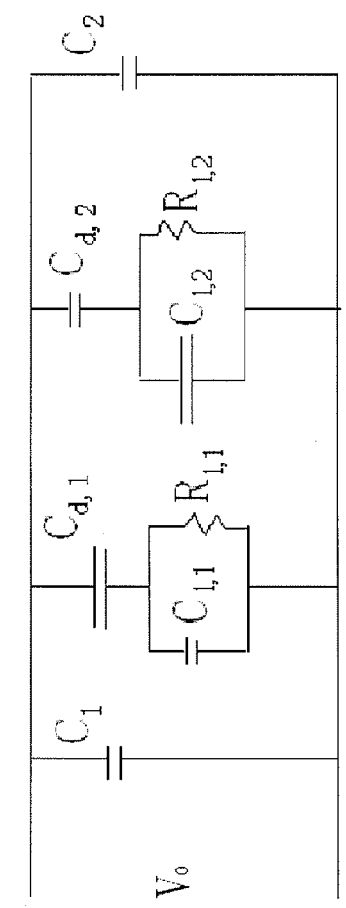
FIG. 2b is an RC circuit schematic for use in understanding the operational states of a frequency-addressable, bistable apparatus according to an embodiment of the invention.

In FIG. 2a, wf represents a volume of working fluid that can be moved from the larger gap $D_1$ compartment to the smaller gap $D_2$ compartment by the high frequency DEP-based electromechanical force and from the $D_2$ compartment to the $D_1$ compartment by the low-frequency EWOD-based electromechanical force. As shown, x represents the distance from the open end of the larger compartment $D_1$ to the trailing edge of the working fluid mass.

The circuit model 250 can be used to calculate the distribution of electric field in the two compartments, and these electric fields can then be plugged into an expression for the electromechanical force derived from a lumped parameter model. For the structure 200, the electromechanical force will be from right to left at low frequencies (EWOD-effect) and from left to right at high frequencies (liquid DEP-effect). The circuit 250 may further be used to predict the electric field distribution inside the liquid wf behind the interfaces in each of the two compartments. In the circuit 250, $C_{d,1}$ represents the capacitance of the portion of the thin dielectric layer $d_1$ on the left side (gap $D_1$) containing the liquid; $C_{1,1}$ and $R_{1,1}$ represent the capacitance and resistance, respectively, of the liquid residing in the left compartment $D_1$; $C_1$ is the composite capacitance representing the portion of the left compartment that contains no liquid (x). The subscript "2" identifies corresponding R and C components in the compartment $D_2$ on the right side.

At low frequencies, the resistor $R_{1,1}$ effectively shorts out the capacitor $C_{1,1}$, so that the entire applied voltage Vo drops across $C_{d,1}$. As a consequence, the electric field in the thin dielectric layer on the left ($d_1$) in the section containing the liquid is very large. Also, $C_{d,1} \gg C_1$, $C_{d,2}$, and $C_2$. Thus, because of the design conditions $D_1 \gg D_2$ and $D_1 d_1 \ll D_2 d_2$, most of the capacitive energy for the entire structure is concentrated in the dielectric layer on the left in the region where wf is present. Thus, the electromechanical force acts to the left, drawing the liquid into the wider gap compartment $D_1$ having the thinner dielectric layer $d_1$.

At high frequencies, capacitive voltage division determines the voltage distribution. Thus, if the dimensional conditions are met, more electrostatic energy is stored in the narrower gap compartment on the right ($D_2$) and the force will act to the right, drawing the liquid into the narrower compartment $D_2$ having the thicker dielectric layer $d_2$.

Figure 3:
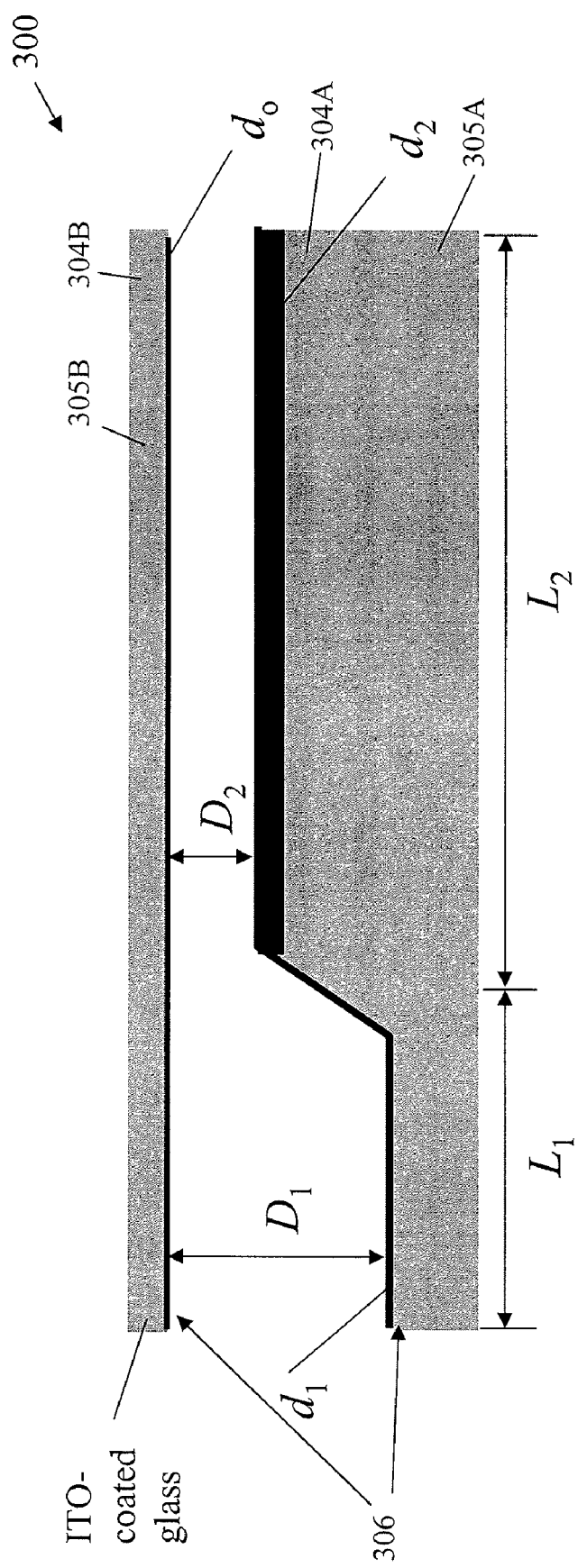
FIG. 3 is a side cross sectional schematic view of a frequency-addressable, bistable, fluid-actuation structure according to an illustrative embodiment of the invention.

FIG. 3 shows a cross sectional schematic view of a bistable apparatus 300 according to an exemplary embodiment of the invention. In an exemplary aspect, the structure 300 represents a sandwich-style, bistable pixel of a display device further illustrated in FIGS. 4 and 5. Operationally, the ability of the pixel to hold a bright image is made possible by two capillarity-maintained hydrostatic equilibria that allow a liquid to exist in either of two configurations and a frequency-dependent electromechanical force that facilitates movement of the liquid back and forth between these two equilibria by brief application of AC voltage at an appropriate frequency. A desired pattern can be written to a display on a pixel-by-pixel basis with the AC voltage applied in a burst. The burst need last only for a relatively short time that is sufficient to write a desired ON or OFF state to each pixel. Once written to the display, the image can be maintained for a relatively long period of time; that is, until a new image is written or the old image is erased, without applying any additional voltage.

The illustrative display embodiment exploits the difference between the electrowetting-on-dielectric (EWOD) and liquid dielectrophoretic (DEP) regimes of the electromechanical force by changing the frequency of an applied voltage between "low" and "high" values. In particular, a lower frequency AC voltage burst is used to move a volume of working fluid to a larger gap/smaller dielectric thickness compartment (left side in FIGS. 3 and 4) while a higher frequency AC voltage burst is used to move the working fluid to a smaller gap/larger dielectric thickness compartment (right side in FIGS. 3 and 4), as described further below.

The exemplary sandwich-style pixel structure 300 as illustrated in FIG. 3 includes two transparent electrodes 304A, 304B in selective spaced relation. The electrodes include substrate portions 305A, 305B that may include, for example, glass, a polymer material such as SU-8™ (an epoxy-based photoresist material) or polyimide, BCB (benzocyclobutene), PDMS (polydimethalsiloxane), coated with, e.g., indium tin oxide (ITO). As shown in FIG. 3, substrate 305B is planar and substrate 305A has a stepped-shape such that two different (wider and narrower) electrode gap thicknesses (or compartments), $D_1$ and $D_2$, are formed, respectively, in a left-side region over length $L_1$ and a right-side region over length $L_2$. The substrate (e.g., 305A) can be wet (chemically) or dry (plasma) etched, milled, ground, or mold formed, for example, depending upon the material, to obtain the desired shape. Each electrode 304 is coated with a dielectric coating 306. The dielectric coating has different, substantially uniform thicknesses, $d_0$, $d_1$, $d_2$, depending on its location where, as shown, the planar electrode 304B has dielectric coating $d_0$ over its entire length; electrode 304B has thinner dielectric coating $d_1$ over length $L_1$ in wider gap region $D_1$ and thicker dielectric coating $d_2$ over length $L_2$ in narrower gap region $D_2$. The dielectric coating advantageously has a dielectric constant $\kappa_d$ equal to between about 2 and 100 and an electrical conductivity $\sigma_d$ less than about $10^{-10}$ Siemens per meter (S/m). Exemplary dielectric materials include essentially all of the low loss polymers and various oxides, e.g., $SiO_2$, $BaTiO_3$. Approximate dimensions for a demonstration prototype based on FIG. 3 were: $L_1 \approx 200\mu$; $L_2 \approx 1000\mu$; $D_1 \approx 500\mu$; $D_2 \approx 100\mu$; $d_1 \approx 1\mu$; $d_2 \approx 10\mu$, $d_0 \approx 0.1\mu$. For a production display it may be desirable to reduce $L_1$ and $L_2$ by a factor of five or more.

Figure 4:
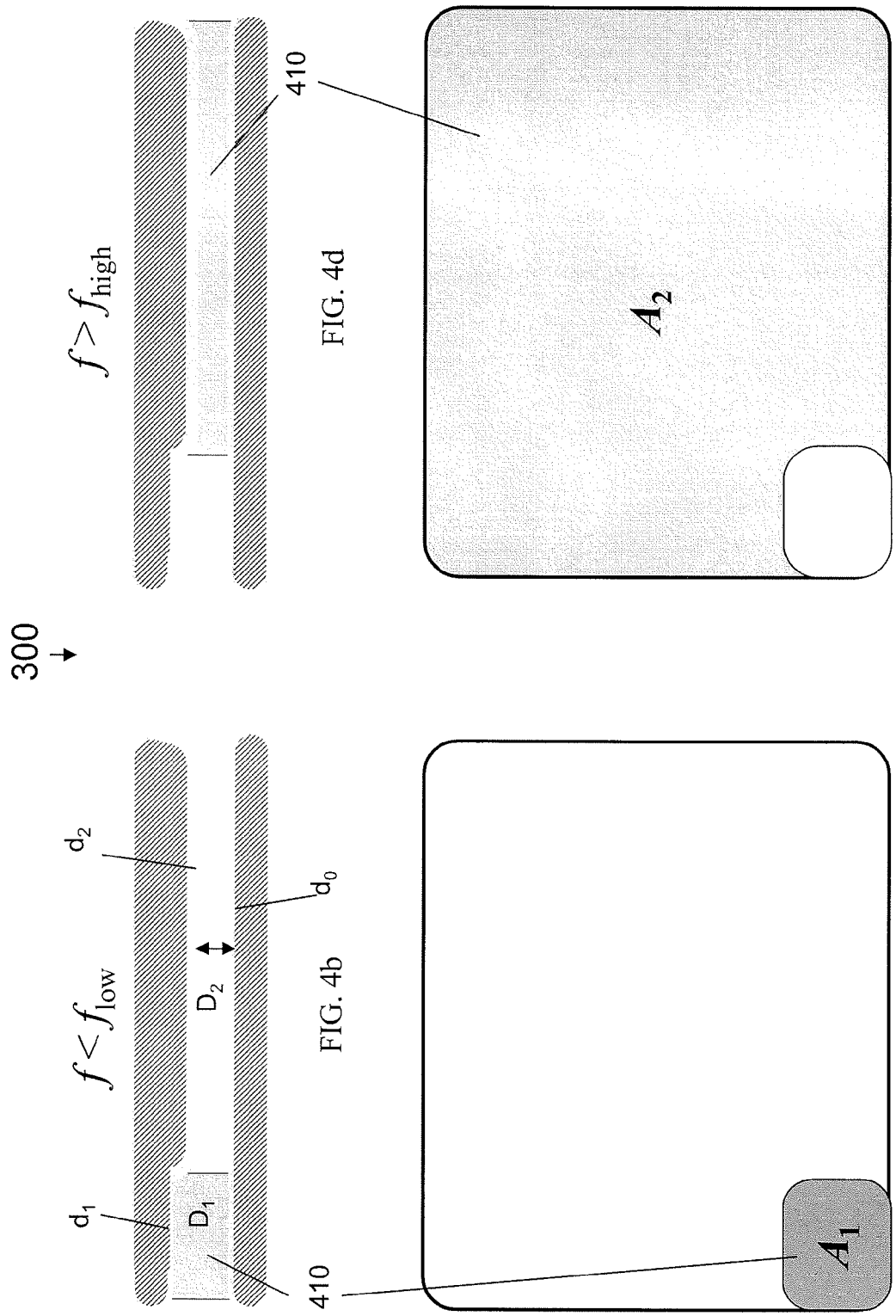
FIGS. 4(a-d) show side cross sectional and elevational views of a frequency-addressable, bistable pixel in its two operational states according to an exemplary embodiment of the invention.
Figure 5:
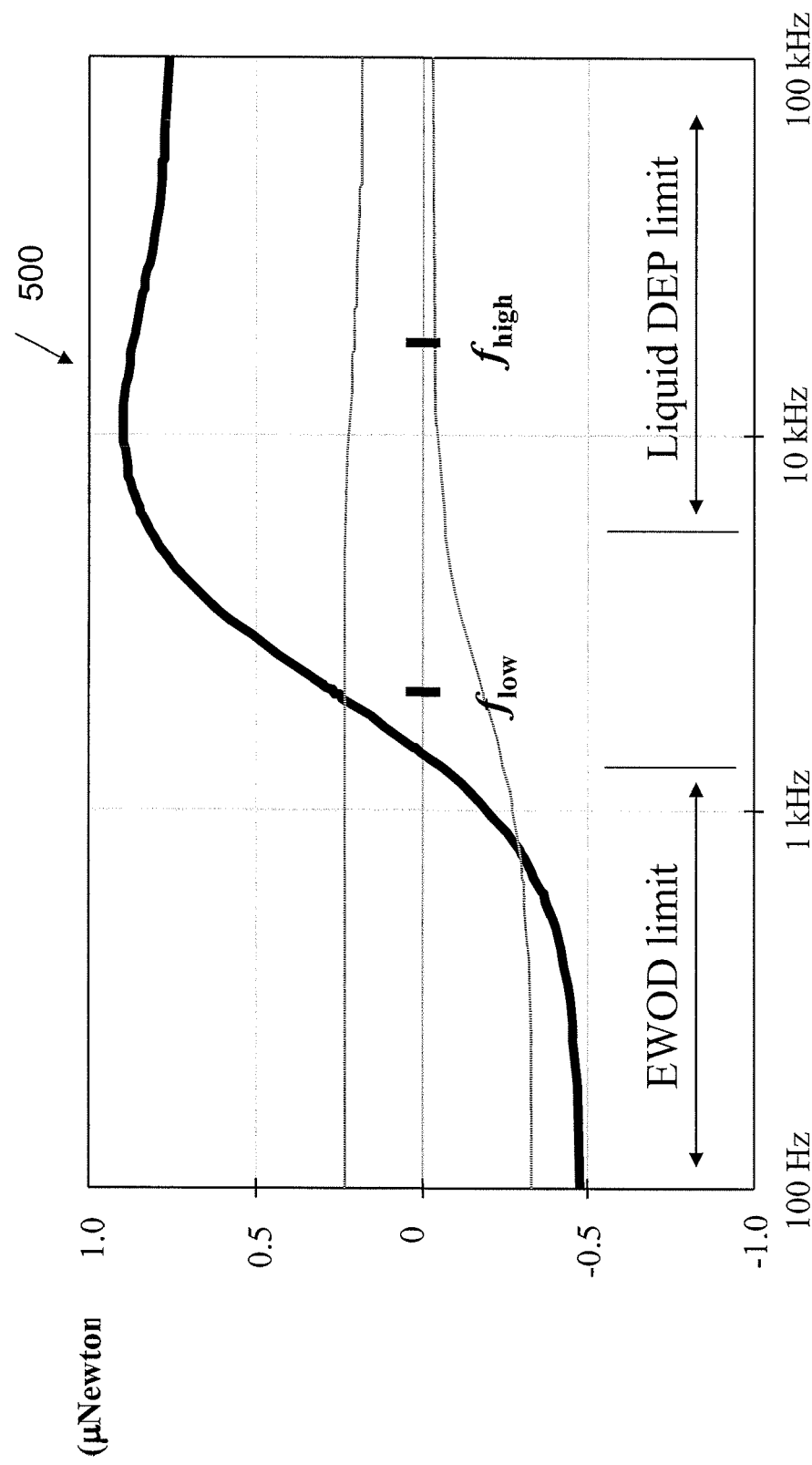
FIG. 5 shows a plot of calculated force (in μN) vs. frequency of the applied voltage derived from a simplified one-dimensional model of a frequency-addressable, bistable pixel according to an illustrative embodiment of the invention.

The exemplary display device pixel 300 uses a semi-insulative working fluid 410 as shown in FIGS. 4 and 5, that can be moved from compartment $D_1$ to compartment $D_2$ (and vice-versa) by electromechanical actuation provided by EWOD and DEP force mechanisms. The working fluid (wf) may be an aqueous salt solution or other ionic liquid, ethylene glycol, certain alcohols, and others, which have an electrical conductivity, $\sigma_{wf}$, in a range between about $10^{-5}$ to $10^{-1}$ (S/m) and a relative permittivity, $\kappa_{wf}$, between about 10 and 100.

Each pixel (and thus the display device) may be designed to work with two fluid components comprising the semi-insulative working fluid and a second, insulating fluid component (i.e., σ≦~$10^{-10}$ S/m). The second fluid component may, for example, be an inert gas, such as nitrogen or argon, or an immiscible liquid such as silicone oil. Either the semi-insulative working fluid or the insulating component may, as appropriate, contain a dye or other form of colorant for effecting a color image. The choice of fluid components will depend on such factors as immiscibility, acceptance of dyes, chemical stability, wetting properties, contact angle hysteresis, and viscosity, in addition to having suitable electrical properties described above. The working fluid or the wf/fluid component combination should necessarily fill the available volume of the pixel.

FIGS. 4(*a-d*) show side cross sectional and elevational views of the exemplary frequency-actuated, bistable pixel 300 in its two operational states; i.e., State 1, when the AC voltage frequency f is less than the low transition frequency $f_{low}$ (FIGS. 4*a, b*) and State 2, when f is greater than the high transition frequency $f_{high}$ (FIGS. 4*c, d*). In particular, FIGS. 4*a, b* show the pixel 300 when the working fluid 410 occupies the larger electrode gap region $D_1$ having the thinner dielectric coating $d_1$ (where $A_1$ is the area of wider gap region $D_1$), while FIGS. 4*c, d* show the pixel when the working fluid 410 occupies the narrower electrode gap region $D_2$ having the thicker dielectric coating $d_2$ (where $A_2$ is the area of narrower gap region $D_2$).

The state of each pixel, with all of the working fluid residing in either a first region (region 1) having approximate volume $D_1A_1$, or in a second region (region 2) having approximate volume $D_2A_2$, is established by the frequency of the AC voltage, which may be applied only long enough to change the state from region 1 to region 2 or from region 2 back to region 1. As illustrated in FIG. 2, all of the working liquid inventory should advantageously reside entirely in region 1 or region 2 with minimal overlap due to the equal volumes $D_1A_1=D_2A_2$.

An operational design constraint for the frequency dependent reversal of the direction of the electromechanical actuation force is $(d_1+d_0)D_1 \ll (d_2+d_0)D_2$. In this case, the liquid collects in the left, wider gap compartment (area=$A_1$) at low frequency due to EWOD, while it collects in the right, narrower gap compartment (area=$A_2$) at high frequency due to DEP.

A more general design condition involving these dimensions and the relative dielectric constants of the dielectric layer and the working liquid may be used to balance the magnitudes of the low-frequency (left-acting) and high-frequency (right-acting) forces. For the case where the magnitudes of the applied low-frequency and high-frequency voltages are equal, the algebraic condition is $$Y(1+X) \approx 2 \frac{D_1}{D_2} \frac{(1+Z)(1+\kappa_w Z)}{1+(2\kappa_w - 1)Z} \quad (1)$$

where $$X = \frac{d_o + d_2}{\kappa_d D_2}, \quad Y = \frac{d_o + d_2}{d_o + d_1}, \quad Z = \frac{d_o + d_1}{\kappa_d D_1},$$

If this relationship is approximately fulfilled by the design of the pixel, then the left-acting and right-acting forces are approximately equal, assuring that the transitional response times are balanced.

In any case, to move the liquid from region 1 to region 2, "high" frequency voltage is applied briefly. This action enlists the liquid DEP force to move the liquid from the wider gap region (region 1) into the narrower gap region (region 2). On the other hand, temporary application of voltage at "low" frequency enlists the EWOD force to move the liquid from narrower gap region 2 back to the wider gap region 1. Due to normal capillarity, the liquid should maintain itself in either configuration indefinitely without any voltage required. If the liquid shows a tendency to spread or creep out due to wetting effects, a brief voltage burst at the correct frequency will move it back into place.

The exact configuration of region 1 and its location in the pixel will be determined by the requirements to create the optimal display by maximizing the aperture ratio for contrast, avoiding Moiré patterns, guaranteeing fully saturated colors from the dyes, and generally maintaining an image that is pleasing to view in accordance with well-known principles of display technology.

Various parameter values for the exemplary embodiments described herein are:

0.1≦$d_0$≦0.8μ;
0.3≦$d_1$≦1.0μ;
1.0≦$d_2$≦10μ;
250≦$D_1$≦800μ;
50≦$D_2$≦100μ;
100≦$L_1$≦1000μ;
800μ≦$L_2$≦8 mm;
w (cell width)≦1500μ;
Vol.: (liquid volume, in % of compartment volume=($L_1 \times D1 \times w$);
f (AC voltage frequency): 50≦f≦5000 Hz;
$V_0$: (rms applied voltage magnitude): 10≦$V_0$≦200V;
2<$\kappa_{dielectric}$<100;
10<$\kappa_{wf}$<100;
$10^{-5}$<$\sigma_{wf}$<$10^{-1}$ S/m.

FIG. 5 shows a plot 500 of calculated force (in μN) vs. frequency of the applied voltage derived from a simplified one-dimensional model of a frequency-driven, bistable pixel having the parameters listed in Table 1. There are two break frequencies, $f_{low}$ and $f_{high}$, one associated with each of the left-side and right-side compartments, respectively. These frequencies are readily predicted from elementary, first-order resistor/capacitor circuit models. For f<$f_{low}$, electrowetting-on-dielectric (EWOD) dominates and the semi-insulative liquid is retained to the left in the small area region ($A_1$) where the spacing is larger. For f>$f_{high}$, liquid dielectrophoresis (DEP) dominates so that the semi-insulative liquid is attracted and then retained to the right, in the much narrower region ($D_2$) having a much larger visual display area $A_2$. Depending primarily on the geometric dimensions of the pixel ($d_0$, $d_1$, $D_1$, $d_2$, $D_2$) and the electrical parameters ($\kappa_w$, $\sigma_w$, $\kappa_d$), there can exist an intermediate frequency range between $f_{low}$ and $f_{high}$ where the force rises to a relative maximum as shown at about 10 kHz. When such a maximum occurs, it provides the advantage of a strong, frequency-based force reversal, which is desirable for good operation.

Other design considerations include: (i) capacitive coupling between addressable electrodes, connecting strips or wires, etc.; (ii) Joule heating of the working fluid; (iii) the two response times between the ON and OFF states; (iv) fabrication methods; (v) choice of second phase, possibly an inert gas or an insulating oil; and (vi) possible influence of capillary forces, including wetting angle and hysteresis.

TABLE 1

$d_1$ = 0.8μ
$d_2$ = 10μ
$d_o$ = 0.8μ
$D_2$ = 50μ
$L_2$ = 1000μ

Figure 6:
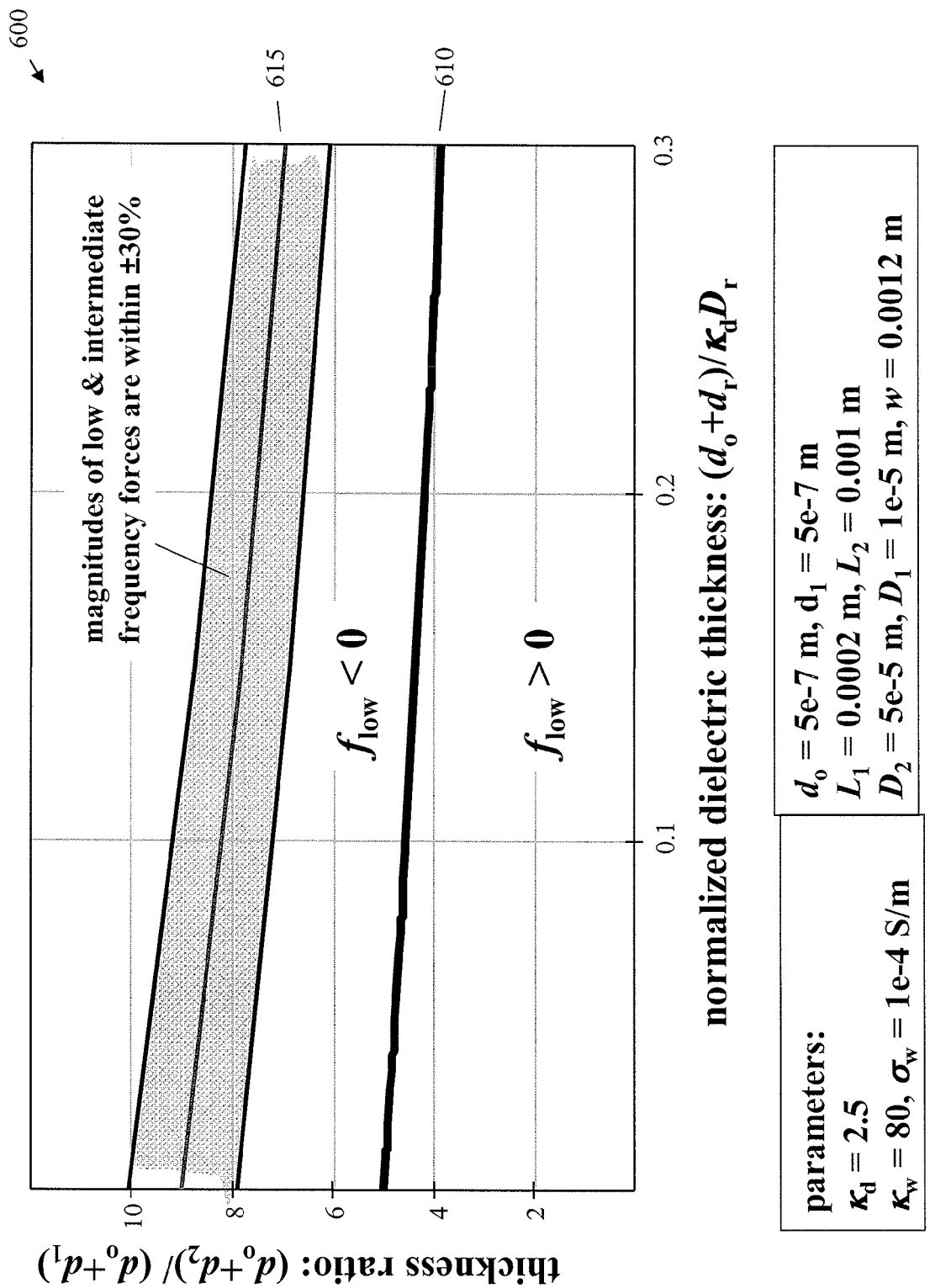
FIG. 6 shows a map of the parameter space that can be useful for optimizing device performance under selected conditions according to an embodiment of the invention.

TABLE 1-continued $D_1 = 250\mu$
$L_1 = 200\mu$
$w = 1200\mu$
$f_{low} = 2.1$ kHz
$f_{hi} = 17.4$ kHz
$\kappa_{wf} = 80$
$\sigma_{wf} = 10^{-4}$ S/m
$\kappa_{dielectric} = 5$ FIG. 6 shows a map 600 of the parameter space for the parameters listed that can be useful for optimizing device performance under selected conditions. The horizontal axis is the total normalized dielectric thickness of the large area, narrow gap region to the right as shown in FIGS. 4c, d, while the vertical axis is the ratio of the thicknesses of the two regions. Device performance is strongly dependent on these parameters and this map can be used to help find the optimal values for good performance. For example, the heavy solid line 610 defines the condition where the low-frequency force is zero. Above this line, the low frequency force is always negative, as required to draw working fluid back into the wider gap/smaller area region $A_1$ in FIG. 4. All working designs should map to the region above this curve. The shaded area 615 indicates the region where the low frequency force and the intermediate frequency force are (i) opposite in sign as required and (ii) equal in magnitude to within ±30%. This second condition is desirable in order to design display systems with approximately equal response times for both changes of state. While in this example the low-frequency and high-frequency voltage magnitudes are assumed to be equal, the embodiments of the invention are intended to cover the possibility that the voltage magnitudes are separately adjusted. This further refinement of these design criteria would be implemented to take into account such factors as asymmetries of the fluid mechanical drag, minimization of the likelihood of electrical breakdown, and dimensional restrictions associated with fabrication processes.

Figure 7:
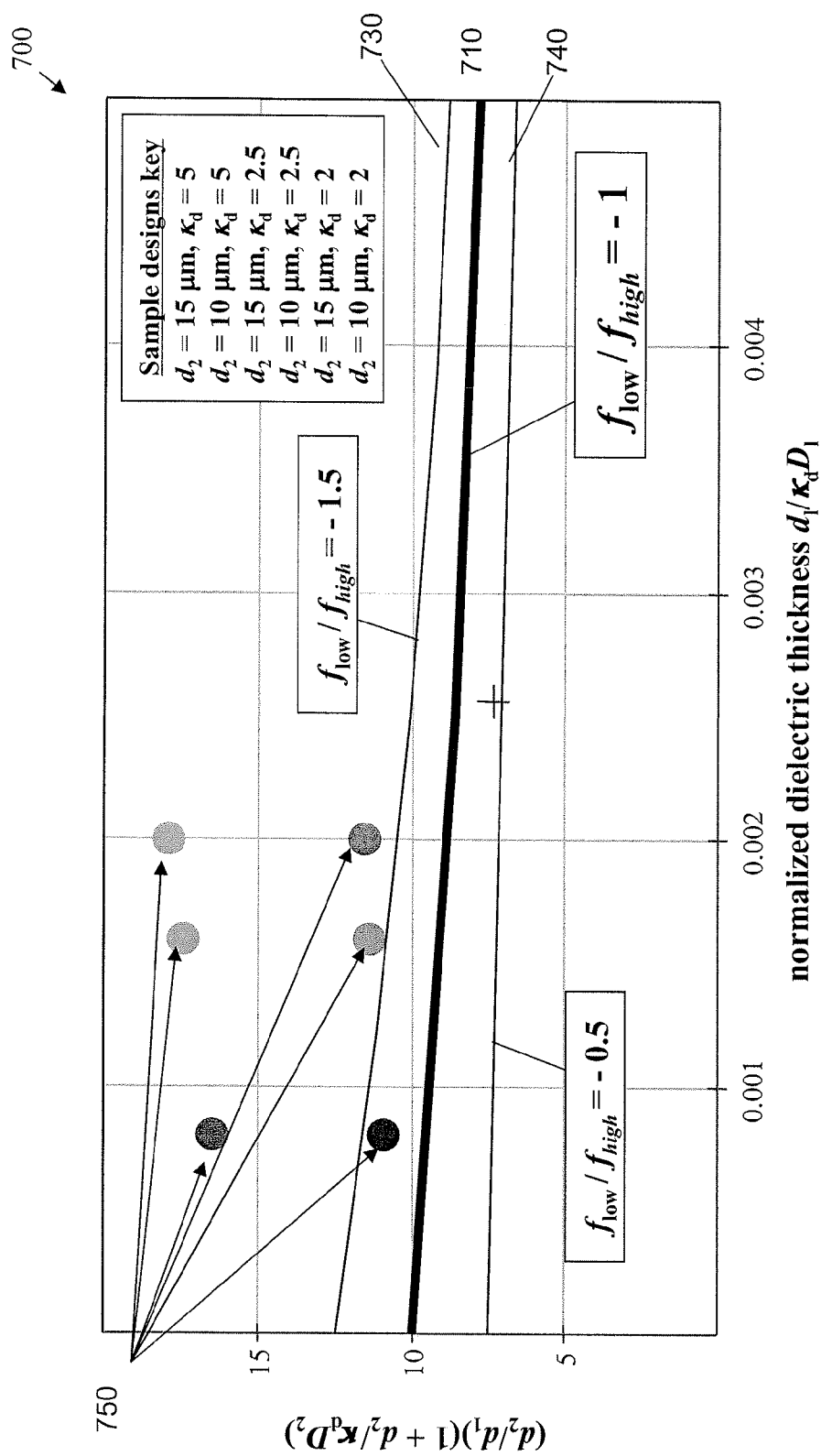
FIG. 7 shows a second bistable pixel design parameter map according to an embodiment of the invention.

FIG. 7 shows a second bistable pixel design parameter map 700 involving the parameters $d_0$, $d_1$, $D_1$, $d_2$, $D_2$ and $\kappa_d$, based in Equation 1 and listed below the figure. This map is similar to the map 600 in FIG. 6, except that it plots the function $Y(1+X)$ versus Z, where Z is the normalized dielectric thickness of the dielectric layer on the left side of the pixel. The heavy solid line 710 marks the condition where the low frequency and high frequency forces are both opposite in sign and equal in magnitude. Adjacent lines 730 and 740 mark the conditions where these magnitudes are within ±50% of each other. Map 700 plots six exemplary designs 750 and illustrates how it is possible to achieve a reasonable balance (within ±50%) between the low-frequency and high-frequency actuation forces at fixed voltage magnitude. It will be evident that, if the low-frequency (left-acting) and high-frequency (right-acting) actuation forces should be more closely balanced in a practical display realization, the voltage magnitudes can be adjusted separately.

Figure 8:
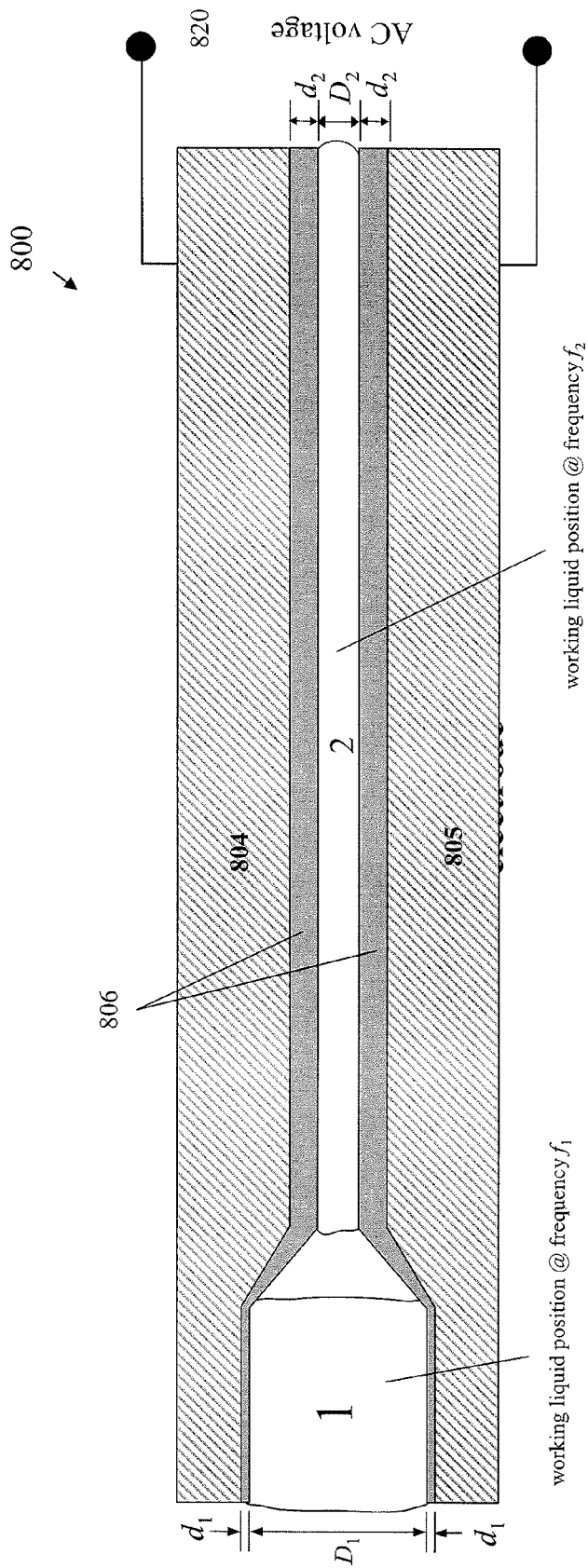
FIG. 8 is a side cross sectional schematic view of a frequency-addressable, bistable, fluid-actuation structure according to an exemplary embodiment of the invention.

According to another exemplary aspect, an apparatus for bistable positional control of a working fluid is shown as 800 in FIG. 8. The apparatus 800 depicts a generic bistable positional control scheme for a suitable semi-insulative liquid mass (working fluid) 810 located between two opposing electrodes 804, 805, connected at 820 to a variable-frequency AC voltage source and associated controller (not shown). The electrodes are coated with a dielectric layer 806 as described above. As illustrated in FIG. 8, the electrode gap has at least two regions, Region '1' and Region '2', forming, respectively, two compartments (1, 2) as shown. As described with reference to FIGS. 3 and 8, the dielectric coating 806 in Region 1 over a length $L_1$ of the electrodes has a thickness $d_1$, while the dielectric coating 806 in Region 2 over a length $L_2$ of the electrodes has a thickness $d_2$, where $d_1 \ll d_2$. The electrode gap in Region 1 has a (wider) spacing $D_1$ while the gap in Region 2 has a (narrower) spacing $D_2$, where $D_1 \gg D_2$. Both regions 1 and 2 have volumes that are substantially equal. According to the embodiments of the invention, the semi-insulative working fluid 810 (as described above) occupies Region 1 and, with no voltage applied, remains in Region 1 (with essentially no overlap into the adjoining Region 2) under the influence of capillary forces. Assuming the proper ratios of $D_1$, $D_2$, $d_1$, and $d_2$, and suitable conductivity of the working fluid, a short voltage burst at the appropriate higher frequency, $f_{high}$, will exert a DEP-based electromechanical force on the working fluid mass to move the fluid mass to narrower Region 2, where it will remain under the influence of capillary forces until a reversed, EWOD-based electromechanical force is exerted on the fluid by a short voltage burst at an appropriate lower frequency, $f_{low}$, where $f_{low} < f_{high}$. While the frequency-controlled fluid actuation is essentially independent of voltage, the frequency-dependent dynamic response can be enhanced by adjusting the magnitude of the applied AC voltage as a function of frequency.

Although FIG. 8 depicts the variations of D and d only in one dimension, structures may be designed to have variation in both lateral dimensions (as viewed in elevation), thereby achieving the frequency-dependent distribution or dispensing of small liquid masses in two-dimensional arrays. Thus, Region 1 and/or Region 2 may be divided into multiple sub-compartments with the restriction that the total volumes of each be approximately equal. Such embodiments will have practical applications in pixel-based displays, microbiological and/or biochemical spotting, and others appreciated by those skilled in the art.

Figure 9:
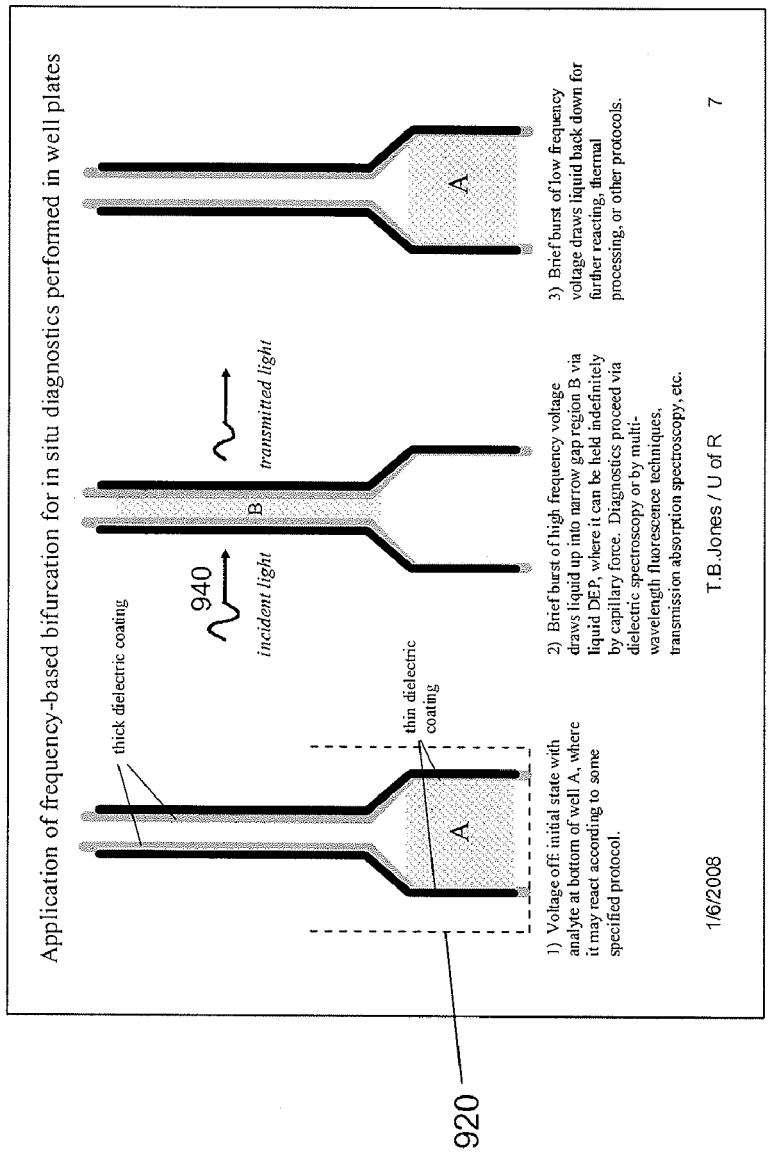
FIGS. 9(a-c) are side cross sectional schematic views of a frequency-addressable, bistable, fluid-actuation structure for use in illustrating the application of frequency-based bifurcation of a fluid according to an exemplary embodiment of the invention.

The general structure and control scheme described above with reference to FIG. 8 can be extended to an exemplary well-plate component and method application as described below and with reference to FIGS. 9(a-c). As shown in the figure, the dielectric-coated electrode structure 800-1 is oriented vertically as opposed to horizontally as shown in FIG. 8. Similar to the apparatus 800, the structure 800-1 has a wider-gap compartment with gap spacing $D_1$ and a contiguous narrower-gap compartment with gap spacing $D_2$. The dielectric coating on the opposing electrodes has a thickness $d_1$ in the wider-gap region and a thickness $d_2$ in the narrower-gap region, where, as before, $d_1 \ll d_2$. According to the exemplary embodiment, the structure can be envisioned to be disposed in the well 920 of a known well plate where an appropriate volume of analyte (working fluid) 910 occupies the bottom of the well. In an initial state with no applied AC voltage, the analyte 910 substantially occupies the wider gap Region A of the electrode structure 800-1, as shown in FIG. 9a. A brief burst of high-frequency voltage draws the analyte up into the narrower-gap region B via liquid DEP, where it can essentially be held indefinitely by capillary force (FIG. 9b). Diagnostic analysis of the analyte by, e.g., dielectric spectroscopy, multiwavelength fluorescence techniques, transmission absorption spectroscopy, or others, can be performed as shown at 940. Thereafter, a brief burst of low-frequency voltage exerts an EWOD-based force on the analyte to draw it back down to the bottom of the well for further reacting, thermal processing, or other protocol, as shown in FIG. 9c. The diagnostics can be performed repeatedly over time as a reaction or biological process proceeds.

According to another exemplary embodiment, a frequency-actuated, bistable droplet dispenser 1000-1 is schematically illustrated in FIGS. 10(a-c). This embodiment comprises a dielectric-coated electrode structure connected to a variable-frequency AC voltage source and controller, as described in the embodiments above, and a working fluid control scheme based on frequency-addressable electromechanical bistability and bifurcation to dispense droplets of the working fluid. The structure includes two opposing, dielectric-coated electrodes 1004, 1005 comprising two substrate components having a conductive layer (e.g., ITO) and dielectric coatings. The inner, opposing surfaces of the substrates are shaped by appropriate techniques depending upon the material to form two wider-gap compartments of length $L_1$ having gap widths $D_1$ at opposite ends of the structure and a contiguous intermediate narrow gap region of length $L_2$ and gap width $D_2$. As before, $L_1 < L_2$; $D_1 >> D_2$ and $d_1 << d_2$.

Figure 10A:
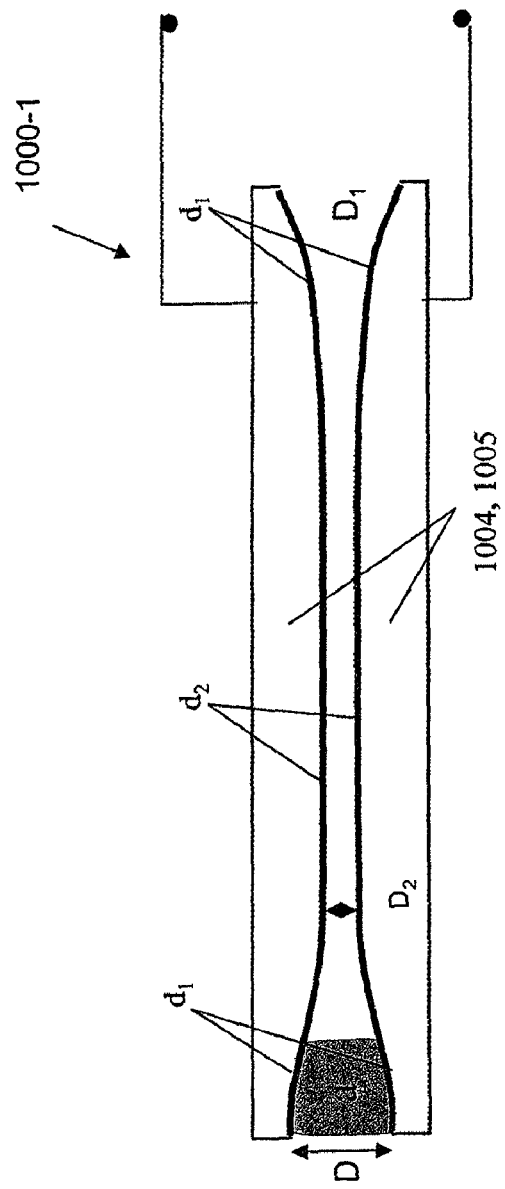
FIGS. 10(a-c) are side cross sectional schematic views of a frequency-addressable, bistable, fluid-actuation structure according to an exemplary embodiment of the invention.
Figure 10B:
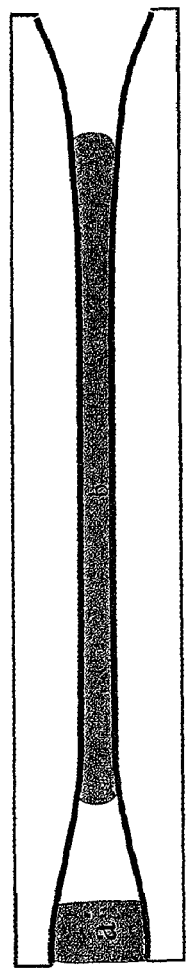
Figure 10C:
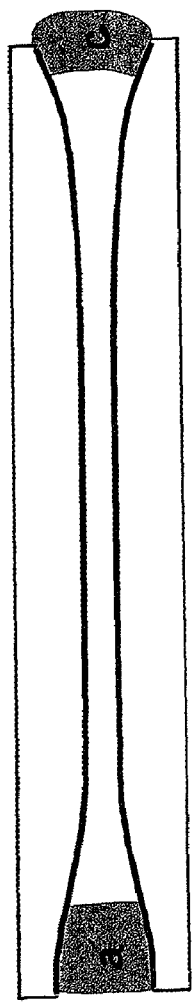

This embodiment uses the frequency-dependent electromechanical force on liquids to dispense droplets by switching the voltage frequency from a low value $f_{low}$ to a high value $f_{high}$, and then back to the low value $f_a$. Initially, at low frequency $f_{low}$ the liquid resides at the left in region 'a' where the gap spacing $D_1$ is larger and the dielectric coating $d_1$ on the electrodes is thin, as shown in FIG. 10a. As shown in FIG. 10b, when the frequency is switched to the higher value $f_{high}$, the liquid is actuated to move into the middle region 'b' where the gap $D_2$ is smaller and the dielectric layer $d_2$ is thicker. The frequency is then switched back to $f_{low}$, causing a bifurcation in the hydrostatic equilibrium at the right side that separates off a small volume, as shown in FIG. 10c. This volume forms a droplet 'c' that then moves to the right edge of the dispenser. Any remainder of the liquid moves back to 'a'. Until the inventory is depleted, the frequency-addressable process can be repeated to dispense more droplets. The voltage magnitude may be simultaneously adjusted as a way to assist the mechanism, but it is the frequency switching that drives the bistable and bifurcation mechanisms exploited here.

Figure 11A:
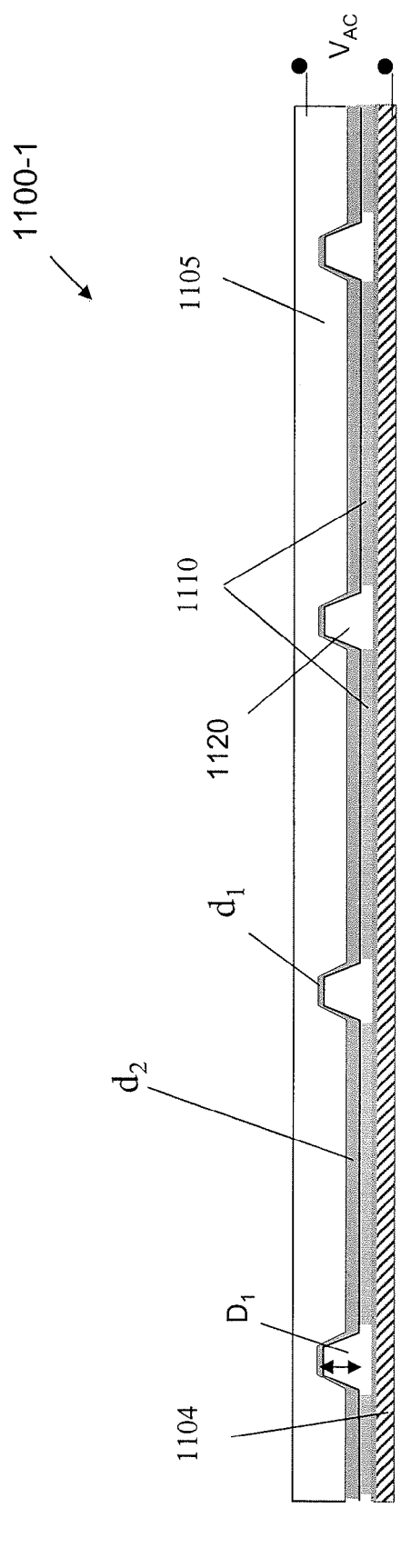
FIGS. 11(a, b) are side cross sectional schematic views of a frequency-addressable, bistable, fluid-actuation structure according to an exemplary embodiment of the invention.
Figure 11B:
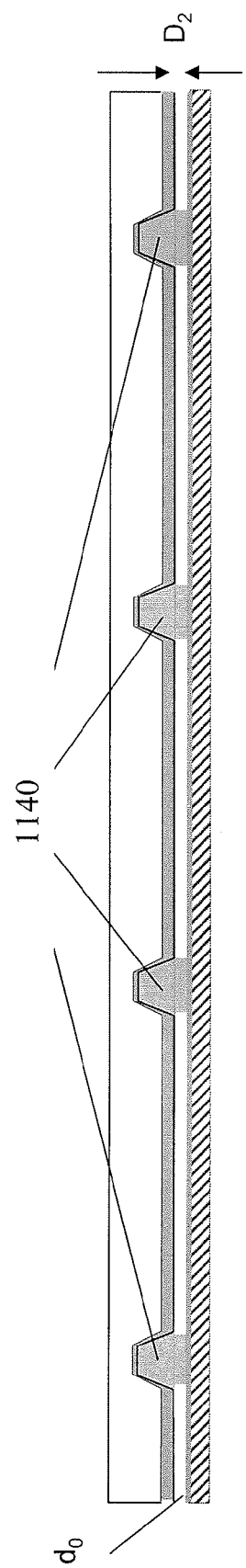

According to another exemplary embodiment, a frequency-actuated, bistable apparatus 1100-1 suitable for use as, e.g., a droplet dispenser array is schematically illustrated in FIGS. 11(a, b). Similar to the exemplary structure 300 depicted in FIG. 3, apparatus 1100-1 includes planar substrate 1104 that is treated with trans-parent conductive coating (e.g., ITO) to form the lower electrode and opposed, micromachined substrate 1105 that is likewise treated with a transparent conductive coating to form the opposite electrode. Flat electrode 1104 has a uniform, thin dielectric coating of thickness $d_0$. Micromachined substrate 1105 includes a plurality of wells 1120 each of which has a bottom surfaces that is coated with a dielectric having a thickness $d_1$. The flat, non-machined portion of the surface of substrate/electrode 1105 is coated with the dielectric having a thickness $d_2$. The structure thus has a narrower-gap region $D_2$ between the opposing flat regions of the electrodes and a wider-gap region $D_1$ between the well bottom and the surface of coating $d_0$. As before, $D_1 >> D_2$ and $d_1 << d_2$; $d_0 \leq d_1$; and otherwise subject to the parameter design constraints set forth above for these values and $\sigma_{wf}$, $\kappa_{wf}$, and $\kappa_{dielectric}$. Furthermore, as above, the volume capacities of the wider-gap regions and the narrower-gap regions are approximately equal.

In this embodiment, the AC frequency-dependent electromechanical force can be used to dispense an array of droplets for applications in spotting of antibodies, proteins and peptides, DNA, and other biological substances on glass slides or substrates for biochemical analyses and protocols. As with the other bistable apparatus and control scheme embodiments described herein, the frequency of the applied AC voltage is used as the control variable to actuate the working fluid. As illustrated with reference to FIG. 11a, a correct volume of working fluid is initially introduced into the narrower-gap/thicker dielectric ($D_2/d_2$) regions by the liquid DEP-based force when the voltage is applied at high frequency to aid in rapid distribution of the liquid throughout the 2D structure. The voltage frequency can then be switched to a lower value, exerting an EWOD-based force on the working fluid, causing the working fluid to be collected in the large gap/thin dielectric ($D_1/d_1$), smaller area droplet wells 1120, which are isolated from one another and positioned according to a predetermined 2D matrix arrangement suitable for optical inspection and/or compatibility with existing spotting systems. According to an aspect, when the working fluid occupies the wells and is retained therein by capillary force, the top electrode structure 1105 can be removed and placed atop a separate functionalized substrate or slide prepared with 2D chemical probe matrix for further processing.

Figure 12:
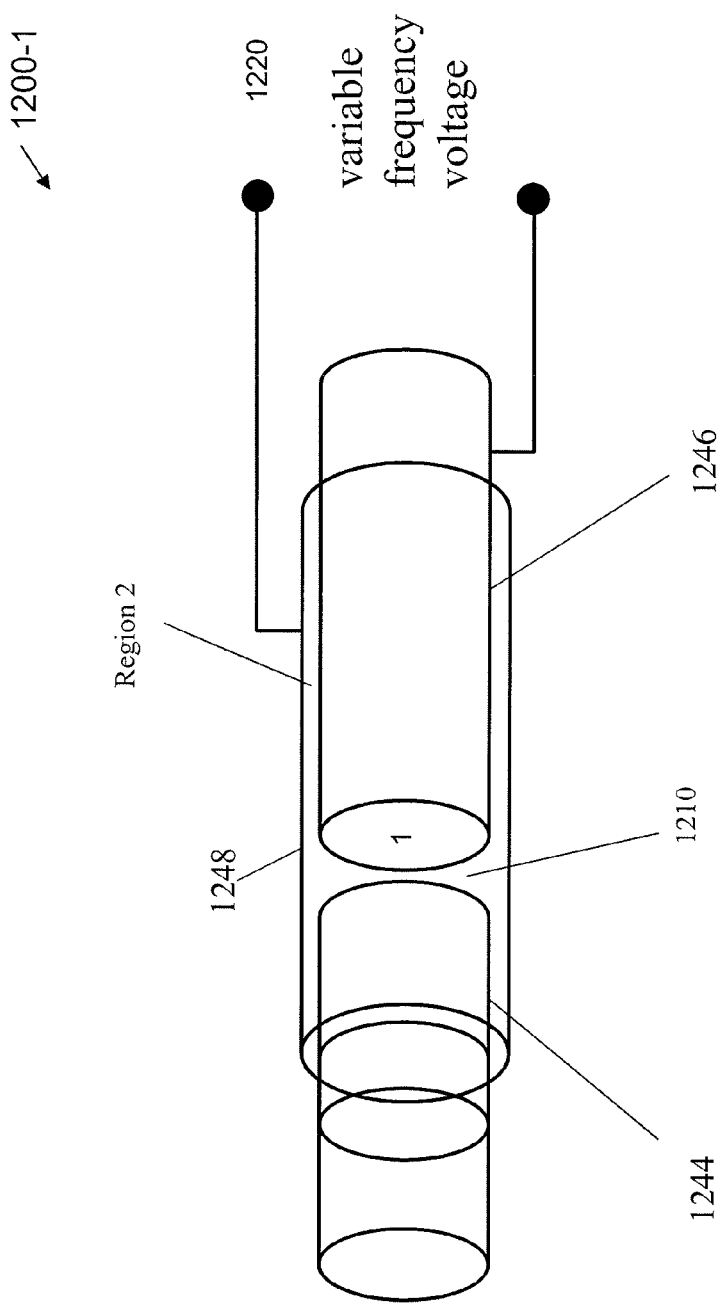
FIG. 12 is a schematic perspective views of a frequency-addressable, bistable, fluid-actuation structure in the form of a fiber optic coupling device according to an exemplary embodiment of the invention.
Figure 13:
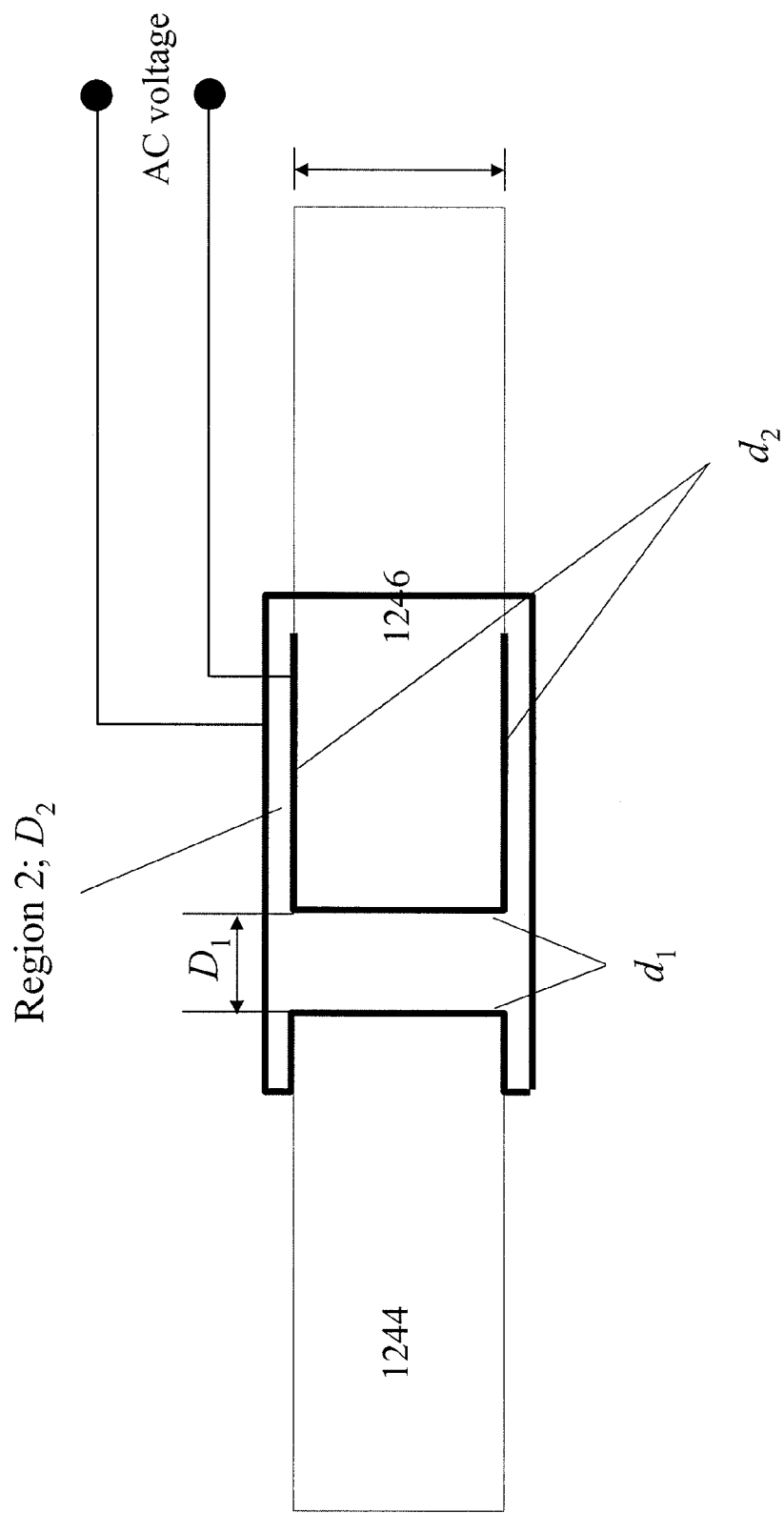
FIG. 13 is a side cross sectional schematic view of the frequency-addressable, bistable, fluid-actuation structure illustrated in FIG. 12 according to an illustrative embodiment of the invention.

According to another exemplary embodiment, a frequency-actuated, bistable apparatus 1200-1 in the form of a fiber optic coupling device is illustrated in FIGS. 12-14. As shown in FIGS. 12 and 14, the coupling device 1200-1 includes two axially adjacent lengths of optical fiber 1244, 1246 that are each clad with conductive material and dielectric coating to provide electrode capability. A collar 1248, the inner surface of which is also coated with a dielectric, concentrically surrounds the fibers as shown to form a collar electrode. The opposing faces of the optical fibers have a thinner dielectric coating of thickness $d_1$, and the gap between the opposing, coated faces of the optical fibers forms Region 1 having a gap spacing $D_1$. The dielectric coating on the cylindrical surface of fiber 1246 has a thickness $d_2$, where $d_2 >> d_1$. The annular gap between the collar electrode 1248 and the fiber 1246 forms Region 2 having a gap width $D_2$, where $D_2 << D_1$. The volume capacities of Regions 1 and 2 are approximately equal so that liquid inventory may reside entirely in cylindrical region 1 between the optical fibers or in annular region 2 with little or no overlap. The electrodes are appropriately connected to a variable-frequency AC voltage source and controller at 1220.

As in the above described embodiments, working fluid positioning is achieved by switching the frequency of the applied voltage back and forth between low and high values. The hydrostatic configuration, with all liquid residing in either Region 1 or Region 2, is controlled by the frequency. That is, voltage at high frequency is applied in a burst only long enough to move the liquid from Region 1 to Region 2 via liquid DEP or, at low frequency to move the liquid from Region 2 back to Region 1 via EWOD-based force. The two distinct, capillary-maintained, hydrostatic equilibria of the device are depicted in a side cross-sectional views in FIGS. 14a, b.

In FIGS. 14a, b, the two hydrostatic equilibrium states of the liquids, 1 and 2, are shown. In FIG. 14a, the liquid 1210 is contained in the large gap $D_1$ (Region 1) between the two optical fibers. In FIG. 14b, the liquid 1210 is contained in the annular space $D_2$ defined by the cylindrical electrode that surrounds and is concentric to the optical fiber 1246. Both states are mesostable due to capillarity, and do not require continuous application of voltage for maintenance, though periodic bursts may be used to maintain a given state for an extended period. A high frequency tone burst of voltage is applied to move the liquid from Region 1 to Region 2. This action enlists the liquid DEP force to move the liquid from left to right into the narrower gap region. On the other hand, brief application of a tone burst at low frequency enlists the EWOD force to move the liquid from Region 2 back to Region 1.

According to an alternative aspect, the gap between the abutting optical fibers could be smaller than the gap between the collar and the fiber. Although the relative thicknesses of the dielectric coatings in these regions would have to be reversed, in all important respects the device would operate according to the same principles.

The bistable embodiments described herein above share the attributes that the EWOD-based and the liquid DEP-based electromechanical forces exertable on the working fluid are dependent only upon the frequency modulation of the applied voltage, irrespective of either the position of the working fluid in the gaps or the volume of the captive working fluid, per the parametric constraints set forth above. In all cases, however, the narrower-gap region $D_2$ always required a thicker dielectric coating $d_2$ than the dielectric coating $d_1$ in the wider-gap region $D_1$. Due to the various efforts involved in fabricating the necessary thicker dielectric coating $d_2$, the inventors recognized the advantages associated with a frequency-dependent, bistable apparatus in which the operative dielectric coating thickness in the at least two gap regions $D_1$, $D_2$ are uniform, equal, and on the order of $d_1$, as described in the embodiment immediately below.

Figure 15:
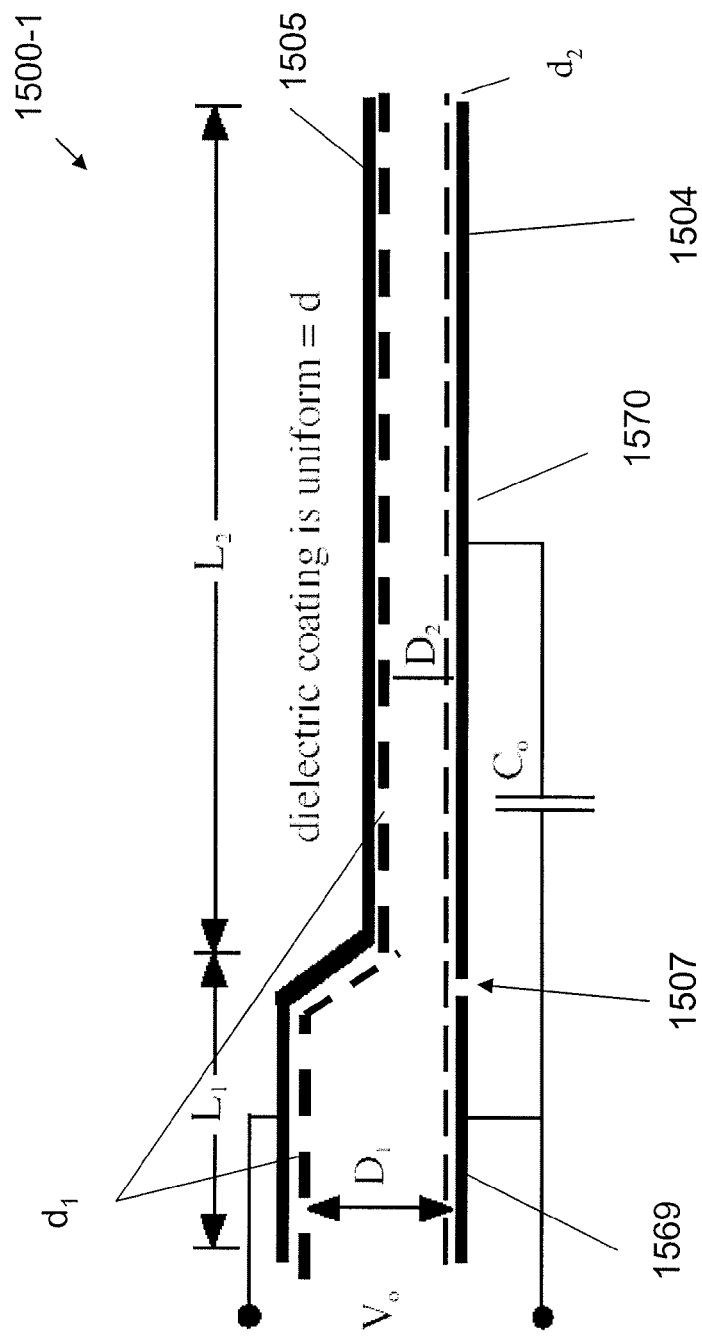
FIG. 15 is a side cross sectional schematic view of a frequency-addressable, bistable, fluid-actuation structure (without a working fluid mass) according to an alternative exemplary embodiment of the invention.

An alternative exemplary embodiment of a frequency-addressable, bistable apparatus 1500-1 is schematically illustrated in FIG. 15. The principle of operation for this alternate structure is essentially identical to that described for the apparatus 300 in FIG. 3. However, as will be described in greater detail below, the flat side electrode 1504 (corresponding to electrode 304B in FIG. 3) is segmented at the adjoining gaps 1507 so that the two parts 1569, 1570 are separately, electrically addressable. An external capacitor $C_0$, is added in series with the $L_2$ section 1570 on the right in the narrower-gap $D_2$ region. The flat side, split-electrode has a dielectric coating of thickness $d_2$ and the opposing electrode 1505 has a uniform dielectric coating of thickness $d_1$, wherein, unlike the bistable embodiments described above, $d_1$ is substantially uniform over the two gap regions. This advantageously provides a significant simplification over the necessity of a non-uniform dielectric coating thickness on the electrodes over the wider and narrower gap regions. The opposing dielectric-coated electrode portions form a spatially-varying gap therebetween having a gap thickness $D_1$ over length $L_1$ that is greater than a gap thickness $D_2$ over a region of length $L_2$. The gap regions $D_1$, $D_2$ have approximately equal volume capacities V. A multiple-frequency AC voltage source is coupled to the electrodes as shown in FIG. 15.

The following discussion and associated FIGS. 15-21 present an analysis of an exemplary frequency-addressable, split-electrode, bistable fluid actuation apparatus and control scheme, as well as some additional constraints not present according to the bistable embodiments described herein above.

Table 2 provides certain parameter definitions and typical ranges used in conjunction with an exemplary proof of concept for the instant split-electrode embodiment.

TABLE 2

Device cell dimensions lengths: L1 = 1 mm, L2 = 8 mm
width: w = 1 mm
dielectric layer thickness: = 5E−7 ≦ $d_1$ ≦ 8E−6 meters
gap between substrates: $D_1$ = 0.8 mm, $D_2$ = 0.1 mm
Variable parameters Vol: liquid volume, in % of the well volume = L1*D1*w.
f: voltage frequency, for range of parameters 50 < f < 5000 Hz.
x: displacement of left liquid side from left side of device.

TABLE 2-continued $V_0$: rms applied voltage magnitude
$C_0$: capacitance of external capacitor: 1E−12 to 1E−9 Farads
Material & working liquid electrical properties $\kappa_{wf}$ = 78, relative permittivity of working fluid
$\kappa_d$ = 2.5, relative permittivity of dielectric coating material.
$\sigma_{wf}$ = 0.0001 S/m, conductivity of working fluid (DI water)

For the non-split-electrode bistable embodiments described above, it was demonstrated that the electromechanical EWOD/DEP forces, F, increased directly with frequency, f and were independent of voltage magnitude, liquid position (x), and liquid volume. At low frequency, F (EWOD) is negative; and at high frequency, F (DEP) turns positive. For the parameters listed in TABLE 2, the transition frequency was 465 Hz. The sign change of F indicates the transition from the EWOD to the DEP regime.

Figure 16A:
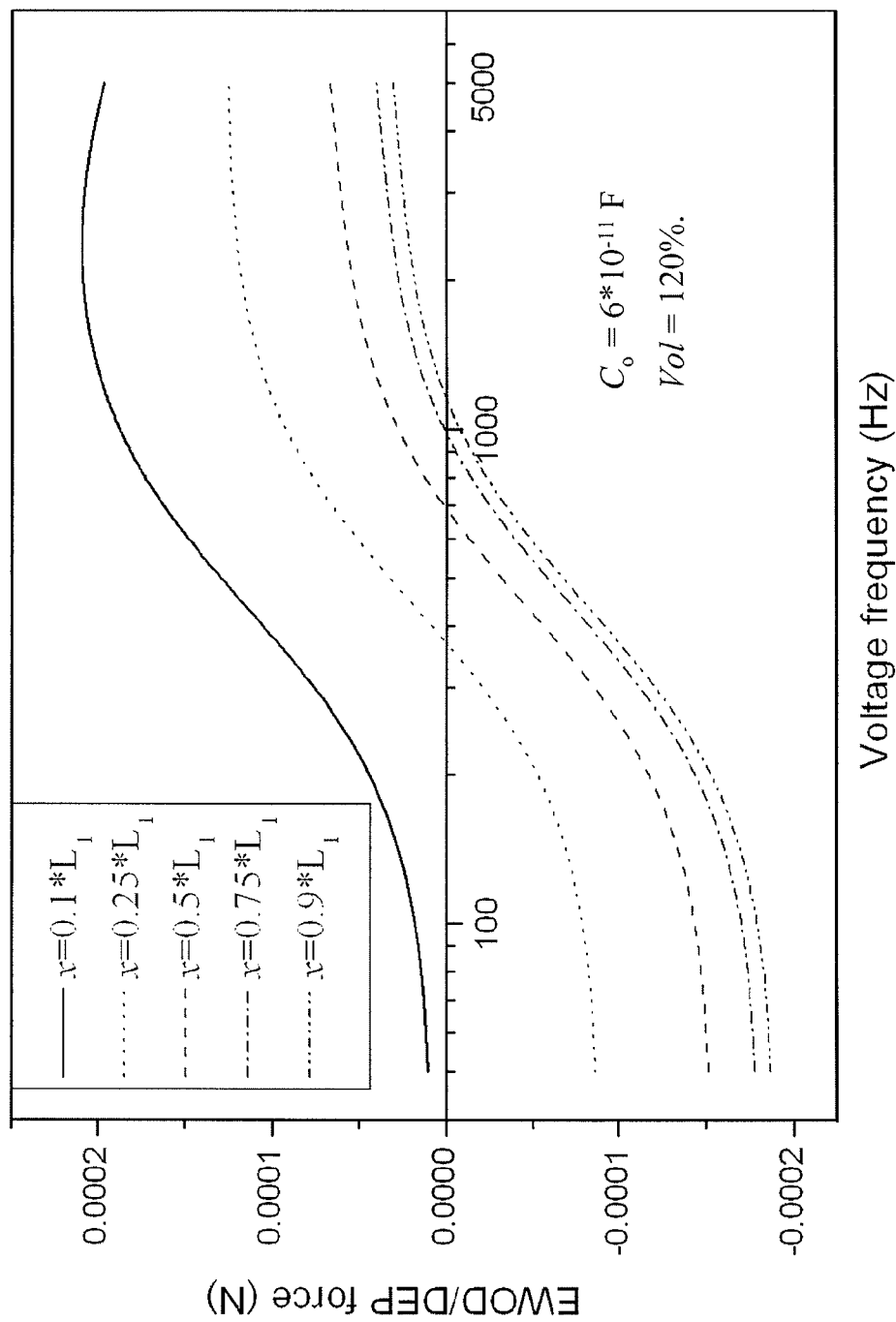
FIG. 16a is a graph showing the EWOD/DEP force, F, as a function of AC voltage frequency f at different positions x of the working fluid mass for the exemplary embodiment illustrated in FIG. 15.

FIG. 16*a* is a graph showing the EWOD/DEP force, F, as a function of AC voltage frequency, f, at different positions x of the working fluid mass as measured by the displacement of the left liquid side from the left side of the device (refer to FIG. 2*a*) for the split electrode embodiment. As shown, the electromechanical force for the new scheme is now dependent on (i) the position of the liquid and (ii) the volume of the captive liquid. Thus, to guarantee the sign reversal of the force that makes it possible to move the liquid back and forth by changing the frequency, the parameters must be well-chosen.

Figure 16B:
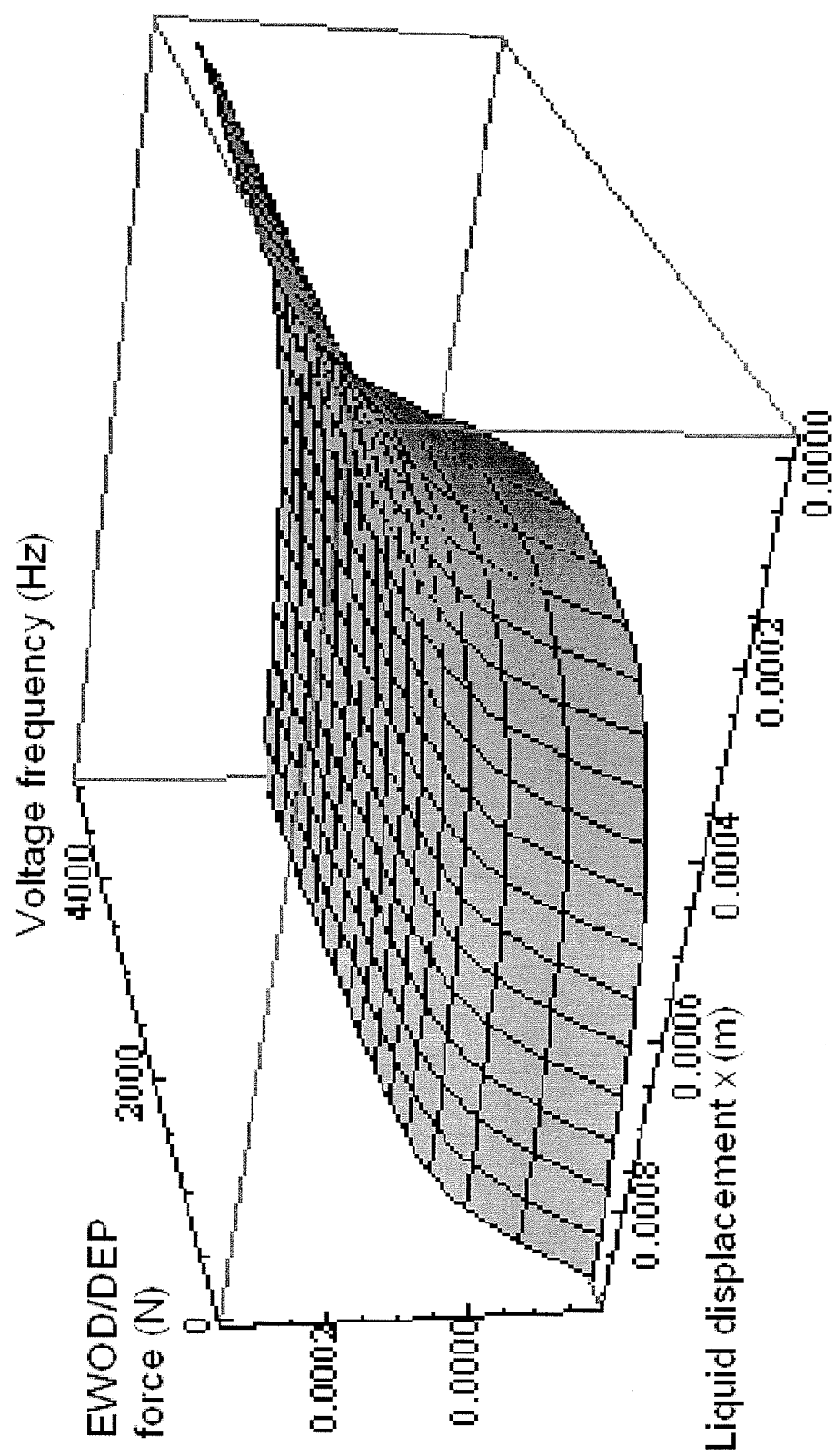
FIG. 16b shows a 3D plot of F as a function of x and f for the exemplary embodiment illustrated in FIG. 15.

FIG. 16*b* shows a 3D plot of F as a function of x and f. Unlike the original (non-split electrode) structure, F becomes dependent on both x and f for the new scheme. For small x (e.g., ≦0.1*L1), F is always positive, revealing that there is a practical working range for the simplified split electrode scheme.

FIGS. 17(*a-d*) show 3D plots that describe the force sign transition for two different values of the captive liquid inventory. As seen from the 3D maps, divided into F>0 and F<0 sections for clarity, there is a threshold value of x for each liquid volume to obtain the desired sign reversal of the force F. This threshold establishes the practical working ranges of the new scheme.

Figures 18A, 18B:
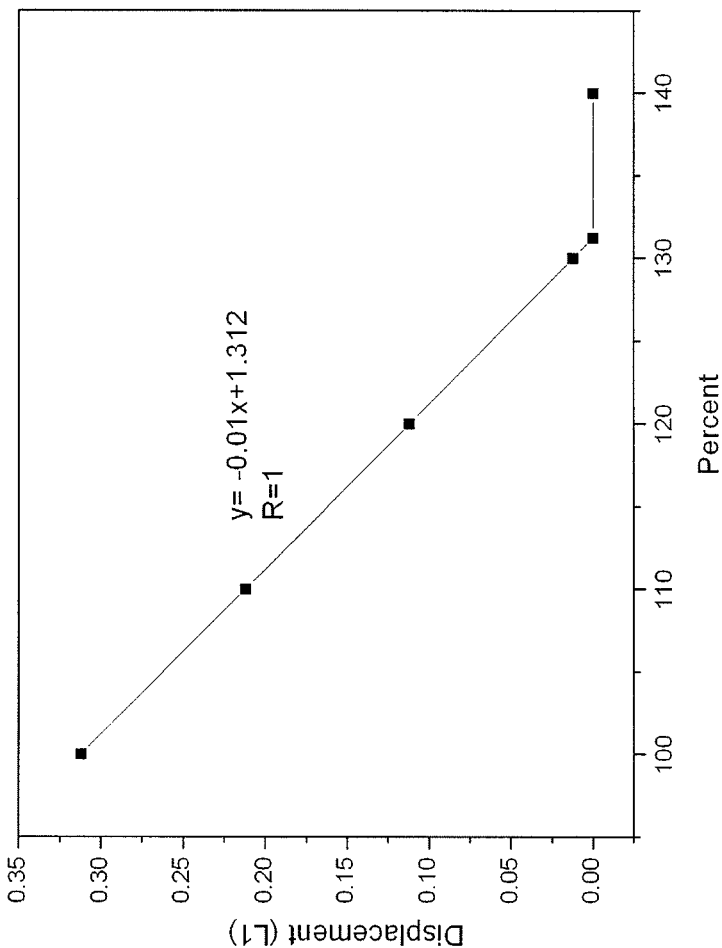
FIG. 18a shows a graph of threshold initial position versus volume according to the exemplary embodiment illustrated in FIG. 15.
FIG. 18b shows threshold x values for different liquid volumes according to the exemplary embodiment illustrated in FIG. 15.

FIG. 18*a* shows a graph of threshold initial position versus volume. The threshold position is the liquid location, as measured by the position of its left free interface, below which there is no frequency-based reversal of the sign of F and above which there is. The plot of threshold x values vs liquid volume Vol shows a linear relationship. The threshold x decreases with increasing liquid volume. FIG. 18*b* shows threshold x values for different liquid volumes. When liquid volume becomes larger than 131.2%, the threshold no longer exist and the sign reversal of force F is achieved at all x values.

Figure 19:
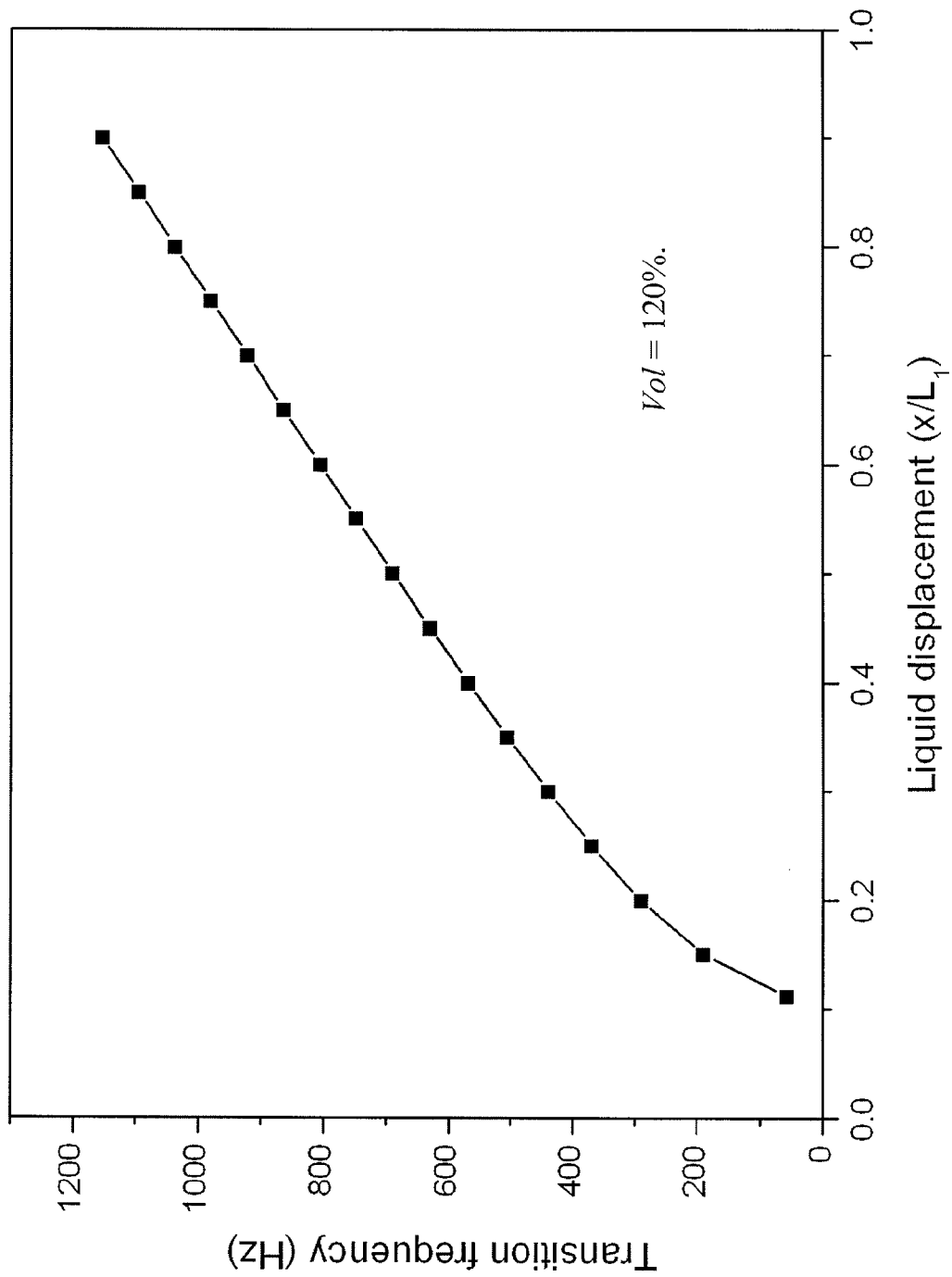
FIG. 19 shows a plot depicting the relationship between transition frequency and liquid position (x) at liquid volume of 120% and shows how the frequency of the force sign reversal changes with the liquid position according to the exemplary embodiment illustrated in FIG. 15.

FIG. 19 shows a plot depicting the relationship between transition frequency and liquid position (x) at liquid volume of 120% and shows how the frequency of the force sign reversal changes with the liquid position. The transition frequency increases directly with x.

By studying a range of liquid volumes, we found the transition frequency is never larger than ~2 kHz for the parameters listed in TABLE 2. Compared with the original device structure, the transition frequency (where F changes from negative to positive) is not constant anymore.

Figure 20C:
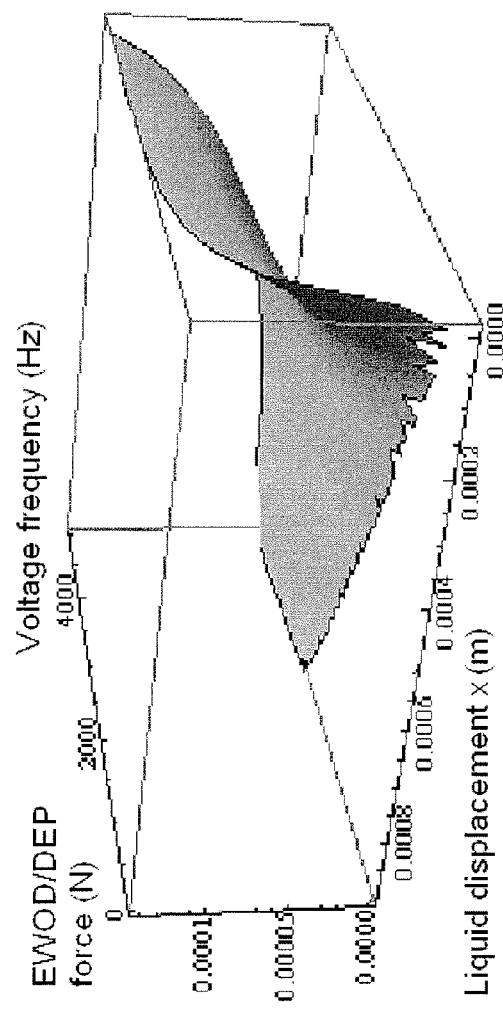
FIGS. 20(a-d) show 3D plots revealing the optimization of the structure parameters for the split-electrode device and how the transition frequency changes with liquid position x and external capacitance $C_0$ according to the exemplary embodiment illustrated in FIG. 15.
Figure 20D:
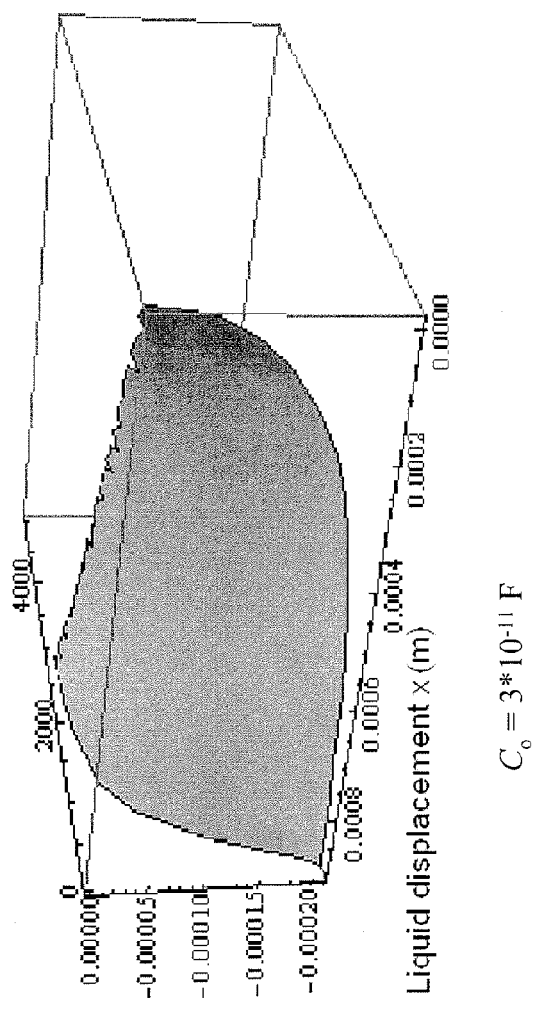

FIGS. 20(*a-d*) show 3D plots revealing the optimization of the structure parameters for the split-electrode device revealing how the transition frequency changes with liquid position x and external capacitance $C_0$. The threshold x can be reduced by adjusting the external capacitor $C_0$. For example, when working fluid Vol=120% of the volume capacity of the gap, reducing $C_0$ from 6E-11 F to 3E-11 F, the threshold decreases to zero.

Figure 21A:
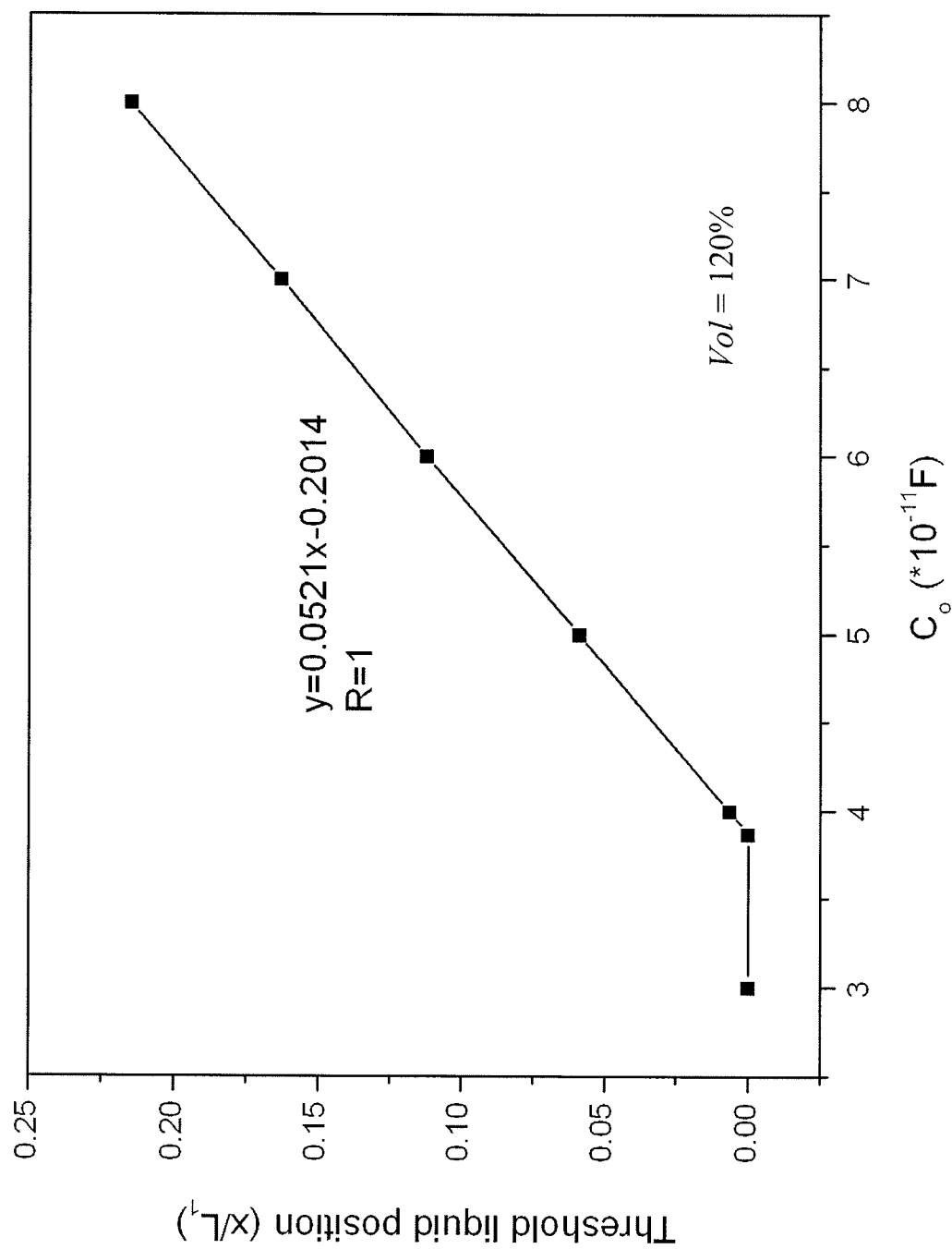
FIGS. 21(a-c) illustrate the optimization of device performance with respect to $C_0$ according to the exemplary embodiment illustrated in FIG. 15.
Figure 21B:
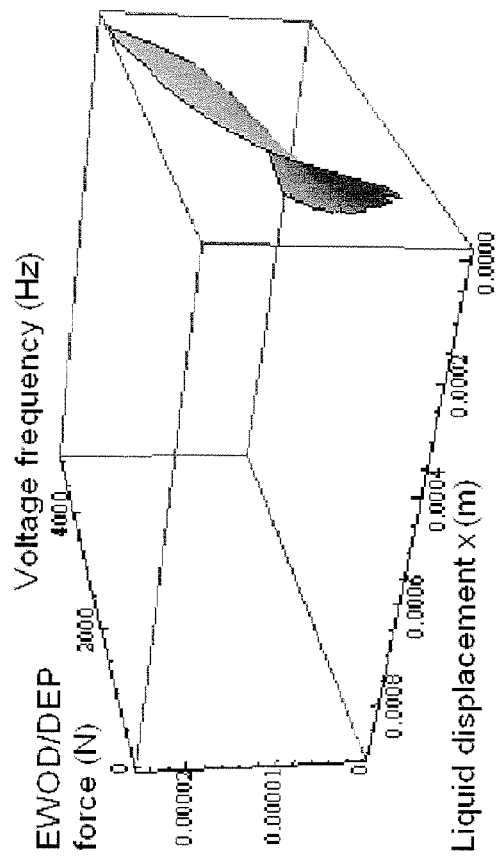
Figure 21C:
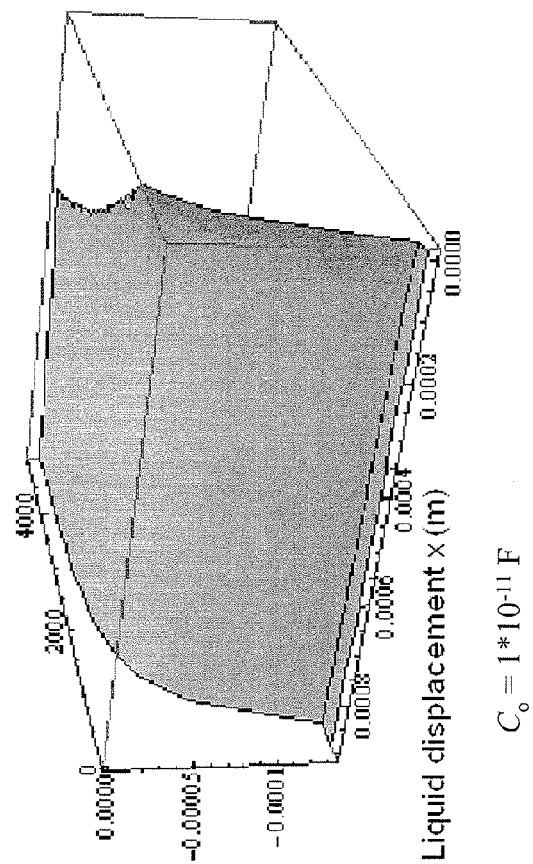

FIGS. 21(*a-c*) illustrate the optimization of device performance with respect to $C_0$. There is a limited range of values for capacitance, ~3E-11 F$\leq C_0 \leq$4E-11 F, where the sign reversal can be achieved for all positions of the liquid. FIG. 21*a* is a plot of threshold x as a function of $C_0$. The threshold value of x is linearly dependent on $C_0$. For $C_0 \leq$3.87E-11 F, the threshold x=0, so the device works at all liquid positions. However, further reducing the external capacitance, e.g., $C_0$~1E-11 F, limits the force to negative values for all frequencies as shown in FIGS. 21(*b, c*). For broad ranges of material and device parameters, e.g., 10<$\kappa_d$<50; 0.5 mm$^2 \leq$area of dielectric material (S)$\leq$5.0 mm$^2$; 0.5μ$\leq$d$\leq$20μ, then 2E-12 F<$C_0 \leq$4E-9 F. More practically, 1E-12<$C0 \leq$1E-9 F. The broad range of $C_0$ is attributed to its need to track the large ranges of the dielectric constant and the area of the narrow gap region of the bistable structure according to the various bistable embodiments.

In summary, for the original frequency-addressable microfluidic invention, the EWOD/DEP force F, as calculated using a circuit model, is dependent only on frequency f, and independent of liquid position x and liquid volume Vol. For the split-electrode embodiment, there are limits on the ranges of certain parameters that must be imposed to achieve sign reversal of the force F. For example, for small volume liquids, the required frequency-based force reversal is not achievable at all liquid positions, while for large volumes, reversal can be achieved for all positions. The threshold initial position value depends linearly on liquid volume. In practical working ranges of the parameters, the transition frequency increases with the liquid position. The transition frequency is usually smaller than ~2 kHz. Performance of the split-electrode embodiment can be optimized by adjusting the external capacitor $C_0$ within a narrow range to realize the essential force reversal effect for any position of the liquid mass.

Figure 22A:
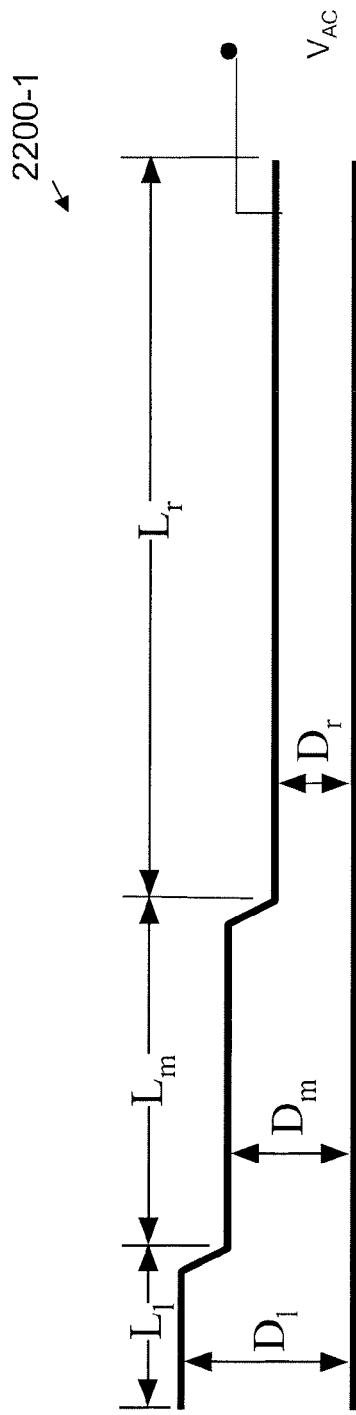
FIGS. 22(a, b) are side cross sectional schematic views of a frequency-addressable, tri-stable, fluid-actuation structure according to an exemplary embodiment of the invention.
Figure 22B:
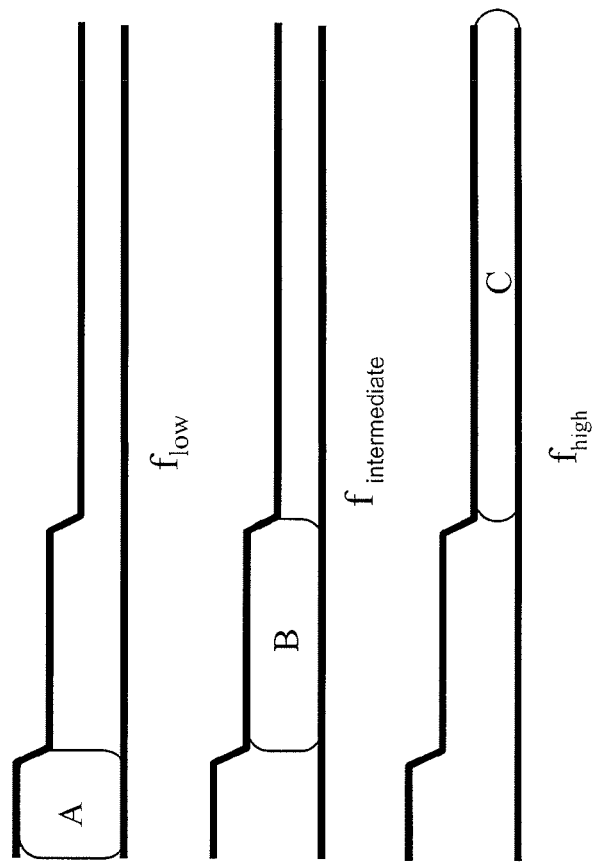

Another exemplary embodiment of the invention is directed to a frequency-dependent, tri-stable structure 2200-1 and control scheme as shown schematically in FIG. 22*a, b*. The tri-state structure has three connected compartments having three regions with different dielectric thicknesses: $d_l \ll d_m \ll d_r$. In this embodiment, the volumes of the left, middle, and right compartments are identical. FIG. 22*b* shows the three equilibrium states of the tri-state geometry: A, B, & C. Liquid is moved from one region to another by applying a tone burst at the appropriate frequency. As with the bistable structure previously disclosed, each liquid configuration is stable, and the voltage is applied in a tone burst at the correct frequency and of sufficient duration to get the liquid to move to the desired new state.

Figure 23:
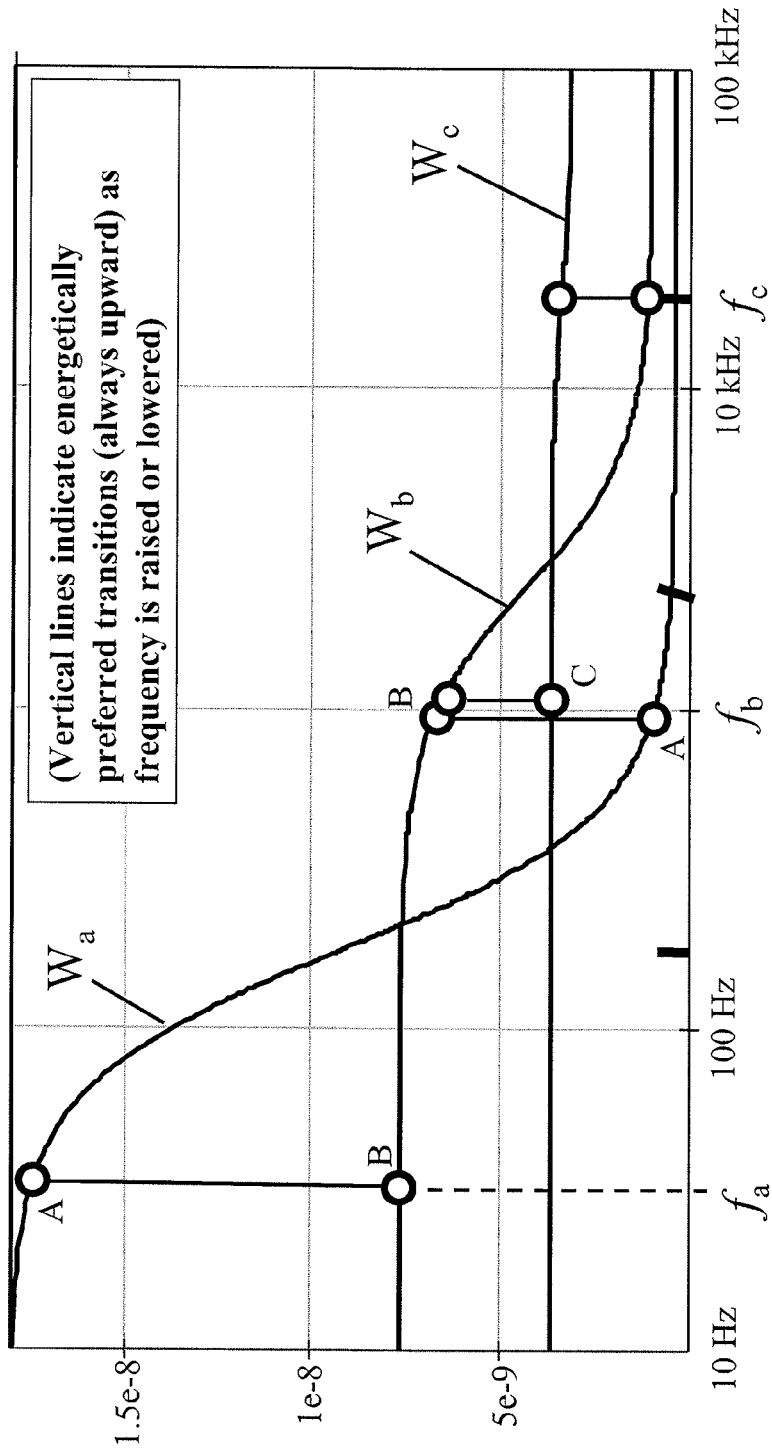
FIG. 23 shows plots of co-energy versus frequency in accordance with the embodiment of FIGS. 22(a, b)

The following values represent a set of dimensional and electrical parameters that achieve the desired behavior in terms of the coenergy function as shown in FIG. 23. In this embodiment, the volumes of the left, middle, and right compartments are identical.

$L_1$=2 mm, w=2 mm, Volume=4 μliters,
$D_1$=1 μm, $D_m$=400 μm, $D_r$=80 μm,
$d_1$=0.5 μm, $d_m$=3 μm, $d_r$=30 μm,
liquid: $\kappa_{wf}$=80, $\sigma_{wf}$=0.0001 S/m; dielectric: $\kappa_d$=5.

In FIG. 23, the plots of coenergy versus frequency show that the preferred configuration of the liquid for the three frequencies $f_a$, $f_b$, and $f_c$ are, respectively, A, B, and C. Coenergy is maximized so the upward transitions are favored. For example, if the liquid is in the middle compartment B, and the voltage is applied at frequency $f_a$, the liquid will preferentially move to the left compartment, A. Likewise, if the liquid is in compartment B and the voltage is applied at frequency $f_c$, the liquid will preferentially move to the right compartment, C.

Figure 24:
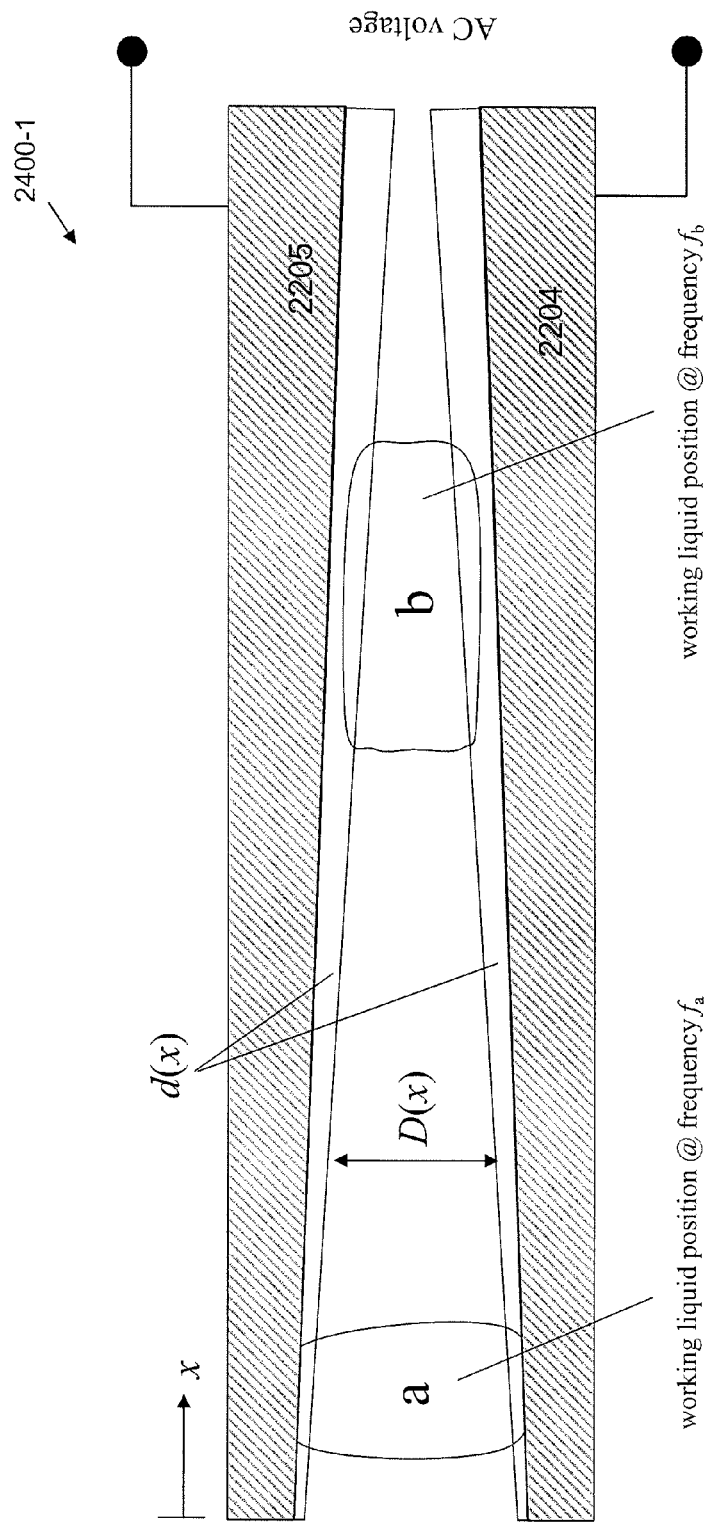
FIG. 24 is a side cross sectional schematic view of a frequency-addressable, analog, fluid-actuation structure (with a working fluid mass) according to an exemplary embodiment of the invention.

In contrast to the bi- and tri-stable apparatus and method embodiments described above, an exemplary embodiment of the invention is directed to an apparatus 2400-1 as illustrated schematically in FIG. 24 provides continuous (analog) micropositional control of a working fluid mass between two dielectric-coated electrodes. Substrate materials, conductive coating materials, dielectric coating materials, and working fluids are the same as those described in connection with the bi- and tri-stable apparatus and method embodiments described above.

In the instant embodiment, the dielectric-coated substrate/electrodes 2204, 2205 are shaped such that when they are disposed in opposing relation, as shown, the gap D(x) varies smoothly as a function of lateral position, x, between the ends of the apparatus and, the dielectric coating d(x) varies in an inverse manner to that of D(x); i.e., as gap width decreases, the dielectric coating thickness increases. In this and the various analog embodiments described herein, d(x) will range from between about 0.3μ and 10μ as D(x) goes from about 800μ to about 50μ.

As shown in the figure, the gap D is wider at the left and narrower at the right and the dielectric layer d is thinner at the left and thicker at the right. Thus, with the working fluid at position 'a' at frequency $f_a$ in the larger gap region, the frequency of the AC voltage can be continuously increased such that the liquid DEP-based force will move the working fluid towards the smaller gap region to position 'b' at frequency $f_b$ where, based on the relative spacing and dielectric thicknesses as depicted, $f_a < f_b$. By lowering the frequency from $f_b$ to $f_a$, the electromechanical force can be reversed and the EWOD-based force will move the working fluid back towards the wider gap region to position 'a'.

Once the working fluid 2210 has reached the equilibrium location where the net electrical force is zero, the voltage may be reduced in magnitude or its duty cycle reduced below 100% to minimize power consumption or Joule heating of the liquid. Moreover, a programmed AC source could be used to adjust automatically the voltage magnitude as frequency is changed.

Although FIG. 24 depicts smoothly tapered variation in only one dimension, tapering can be achieved in both lateral dimensions (as viewed in elevation) to achieve any desired predetermined, two-dimensional frequency-dependent reconfiguration of the liquid.

FIGS. 25(*a, b*) schematically illustrate another exemplary embodiment of the invention that is directed to an analog-based apparatus 2500-1 for dispensing liquids via frequency-dependent hydrostatic bifurcation. This apparatus depicts a generic scheme for repeatable dispensing or distribution of small, controlled volumes of liquid to predetermined regions distributed along coated and tapered electrodes by a bifurcation of the electric field coupled hydrostatic equilibrium. The structural design of the apparatus is similar to that of apparatus 2400-1 in FIG. 24, except that at least one fluid well 2540 having a dielectric coating thickness dwell on top and bottom surfaces thereof, and a gap spacing $D_{well}$ that is greater than the gap spacing D(x) immediately adjacent the well, is formed between the electrodes within the apparatus. In an exemplary aspect, the well 2540 is cylindrical and thus the continuously variable gap would divert smoothly around the circumference of the well.

Figures 25A, 25B:
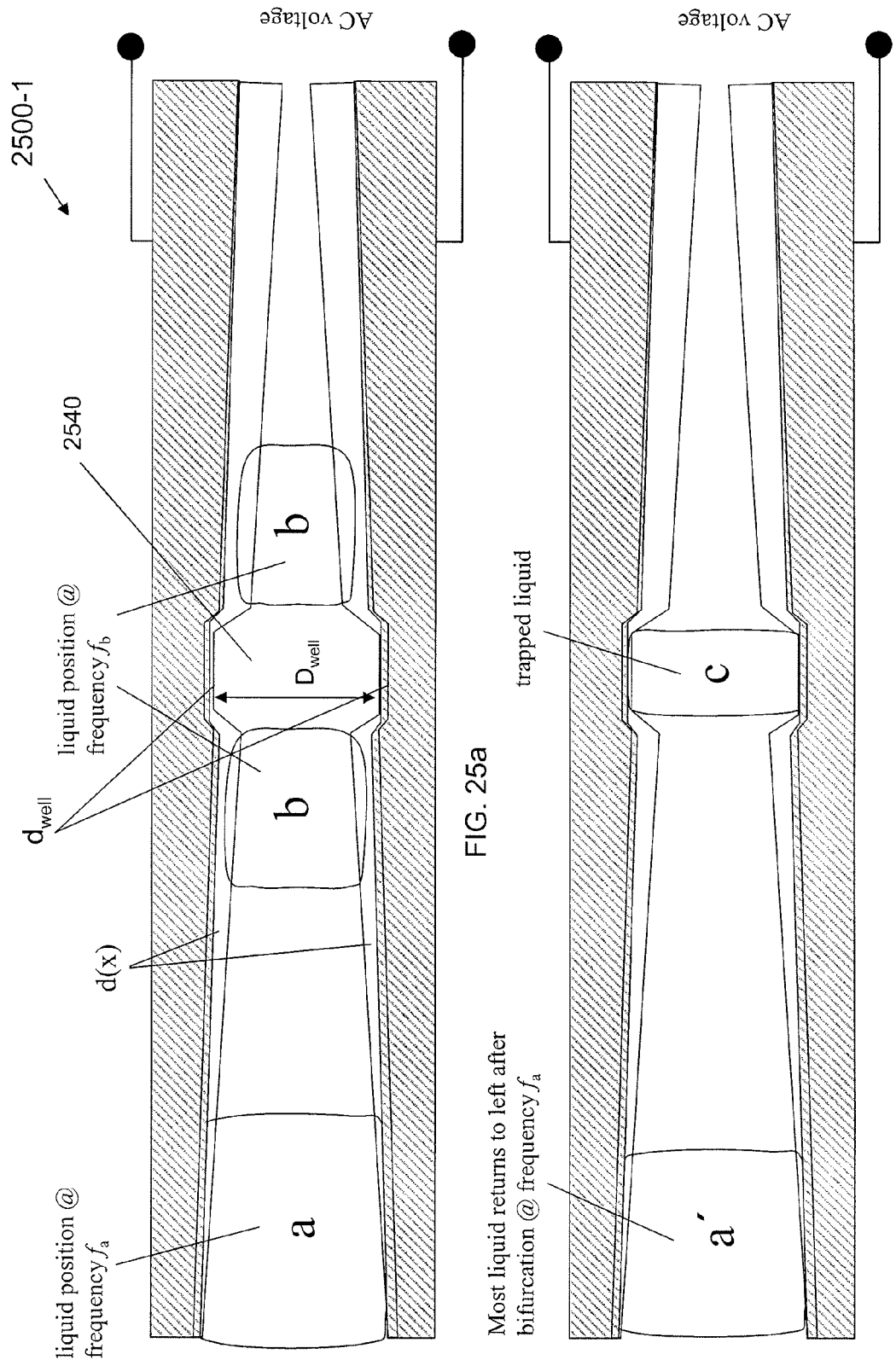
FIGS. 25(a, b) are side cross sectional schematic views of a frequency-addressable, analog, fluid-actuation structure (with a working fluid mass) according to an exemplary embodiment of the invention.

The operational steps to achieve the bifurcation depicted in FIG. 25 are as follows: An initial inventory of working fluid 2510 is held in position 'a' at left (EWOD limit of electromechanical force) via AC voltage at some frequency $f=f_a$. When the frequency is raised to $f_b$, the working fluid responds by moving towards the right (liquid DEP force limit) to a new equilibrium 'b' surrounding region 'c' which represents the compartment formed by the well 2540. Note that no liquid enters the region 'c' at this point. When frequency is now reduced back down to $f_a$, a bifurcation of the hydrostatic equilibrium occurs, trapping a predetermined volume of liquid in region 'c', with the remainder of the liquid returning to the left into region a' as shown in FIG. 25b.

For illustration purposes, the FIG. 25 shows a one-dimensional realization of this embodiment of a hysteretic liquid manipulation scheme; however, structures with two-dimensional variation (as viewed in elevation) may be designed. These 2D structures could be used, for example, for frequency-dependent dispensing of large droplet arrays for biomedical applications in microspotting and sample dispensing.

Figure 26:
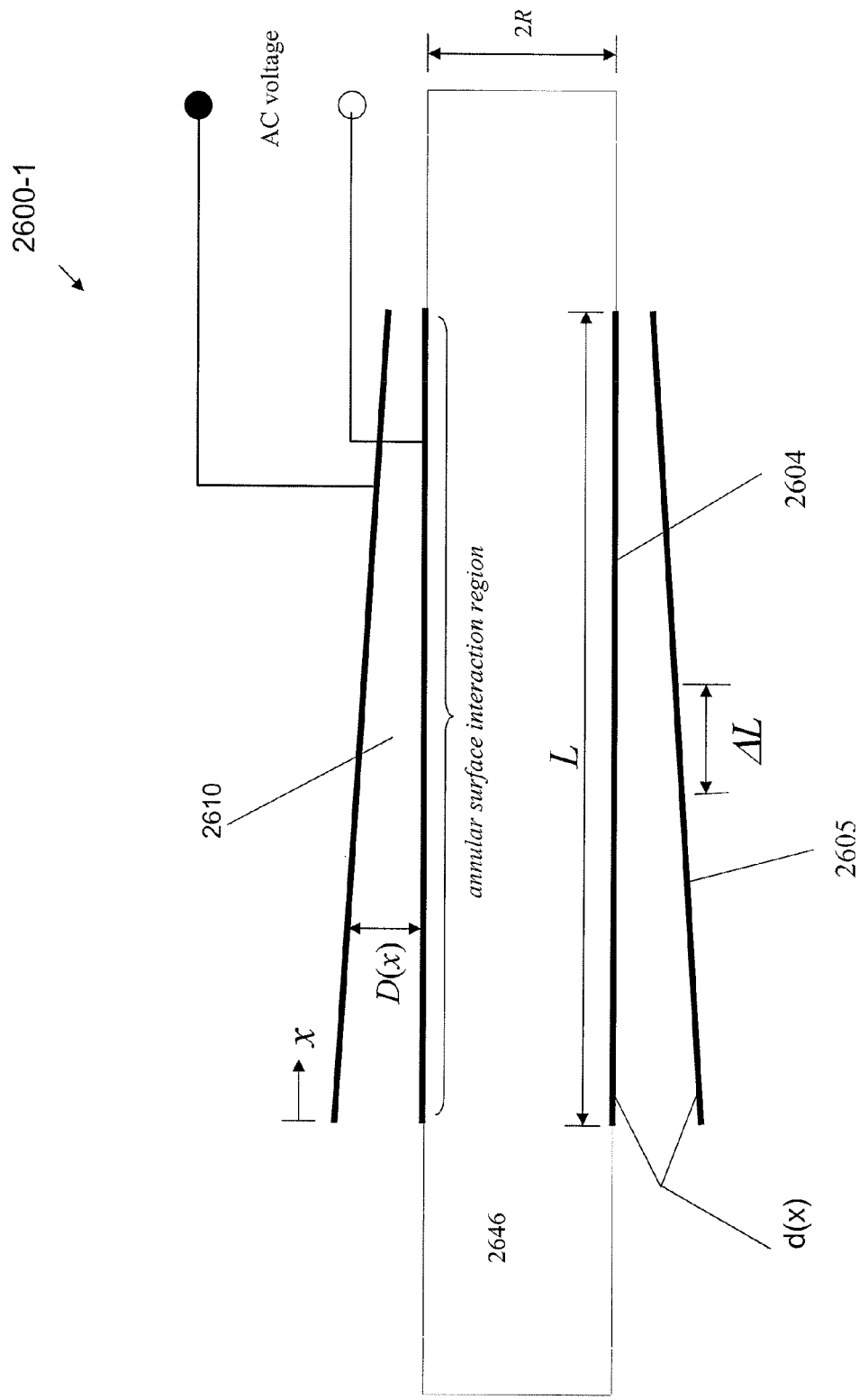
FIG. 26 is a side cross sectional schematic view of a frequency-addressable, analog, fluid-actuation structure (with a working fluid mass) in the form of a fiber-optic attenuator according to an exemplary embodiment of the invention.

FIG. 26 schematically illustrates another exemplary embodiment of the invention that is directed to an analog-based apparatus 2600-1 depicted as a continuously adjustable electrooptical attenuator. The device and its principles of operation are derived from that of the analog fluid position control apparatus 2400-1 described above. As shown, the apparatus 2600-1 includes an optical fiber 2646 in which a portion of the outer surface is coated with a conductive material, e.g., ITO, to form a transparent, inner electrode of the apparatus at 2604. The outer electrode 2605 is formed by a tapered tube disposed concentrically about a portion of the fiber. As further shown, the electrode gap D(x) varies smoothly and continuously over the length of the electrodes and in the diagram is wider on the left side and narrower on the right side. As in the embodiment of FIG. 24, the electrodes are coated with a spatially-varying dielectric having a thickness d(x) that varies in an inverse manner to the gap spacing; i.e. the dielectric coating is thinnest where the gap is most wide and becomes increasingly thicker as the gap narrows. A working fluid 2610 occupies a portion of the gap D(x).

Due to the spatial variation of the gap over the electrode length L, the axial length ΔL of the fluid changes as the working liquid moves back and forth in the spatially-varying annular gap, depending on the direction of the frequency-addressed electromechanical force. This electrooptical device uses smooth variation of the gap D(x) and the dielectric coating thickness d(x) to allow precise positioning of a working liquid mass along the perimeter of an optical fiber. Actuation is achieved by incremental variation of the frequency of the AC voltage applied to the electrodes. In this embodiment, dD/dx<0 and dd/dx>0. Thus, the mass moves to the right as frequency is increased and moves back to the left as frequency is decreased. Because of this axial variation of the gap D(x) and because the liquid inventory is fixed (in the form of an annulus surrounding the fiber), the length ΔL changes smoothly as the liquid is moved back and forth. For the embodiment shown, ΔL increases as the mass moves from left to right and decreases as the mass moves from right to left. If the liquid is chosen so that it alters the reflective properties at the outer surface of the optical fiber, then changing the length of the liquid annulus ΔL provides a means to control optical signal attenuation by adjustment of the voltage frequency. Furthermore, being able to move the annular liquid mass back and forth has the additional possible use of providing a tuning capability.

Another set of exemplary embodiments of the invention are directed to a smart well-plate component, smart well-plates, and associated control methods. These embodiments facilitate automated microbiological and biochemical procedures using frequency modulation to exploit electrowetting and/or liquid DEP. The embodiments described herein below operate via the exploitation of electromechanical forces exerted by non-uniform electric fields, specifically electrowetting on dielectric (EWOD) and liquid dielectrophoresis (DEP), to manipulate, mix, and separate liquid (e.g., supernatant, excess analyte, wash solution, etc.) within individual wells of a well plate. Either the well plate, a disposable well plate component made, for example, of molded plastic, or an accessory device or both are patterned with individually addressable electrodes and appropriate dielectric and/or hydrophobic coatings. With these enhanced capabilities, the device is designated as a "smart well plate" because individualized operations and processing can be programmed, carried out, and monitored on individual wells in the well plate.

Figure 27:
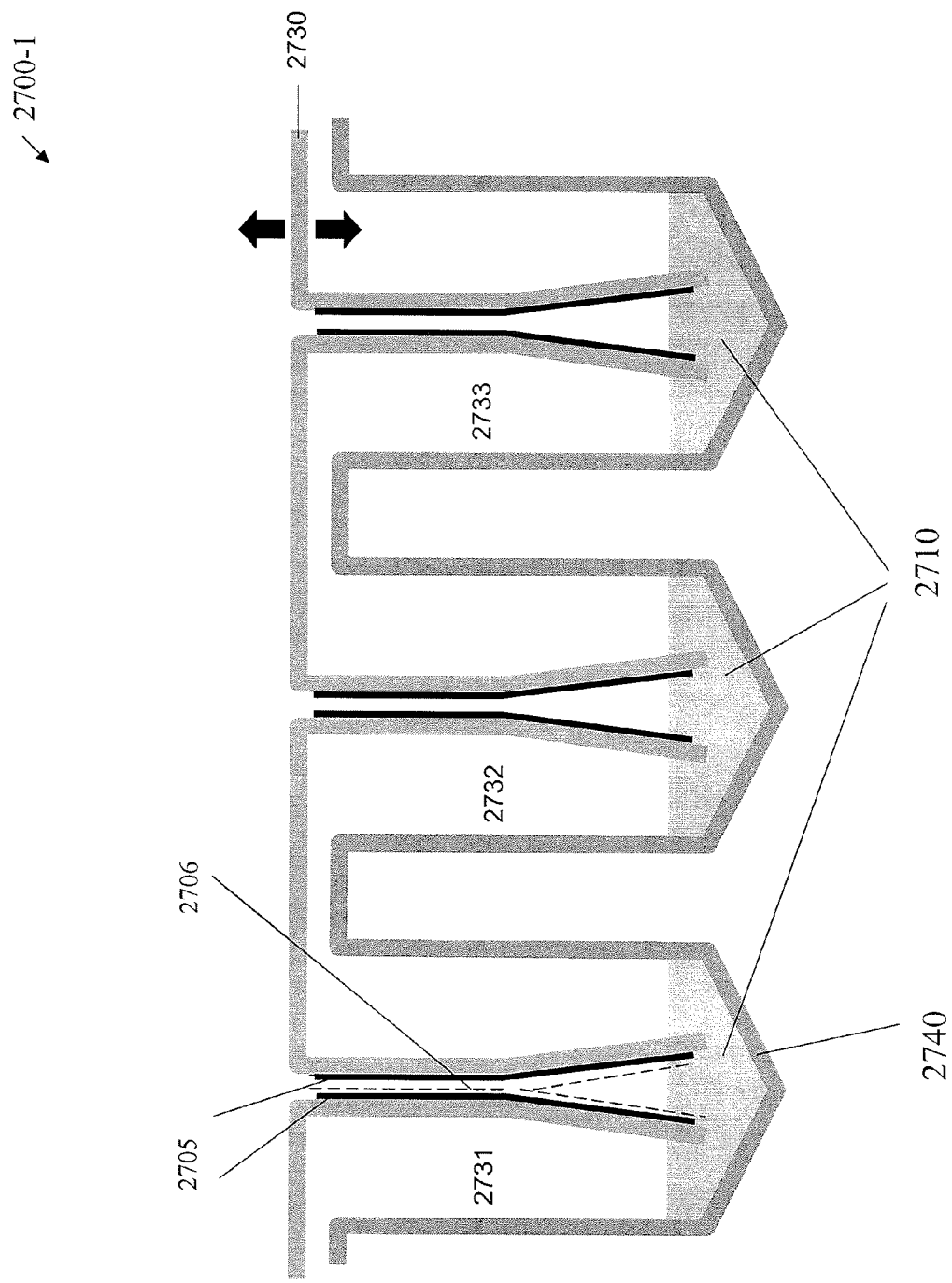
FIG. 27 shows a side cross sectional schematic view of a frequency-addressable, liquid-actuation apparatus for use in a fluid sample well plate array according to an exemplary embodiment of the invention.
Figure 28:
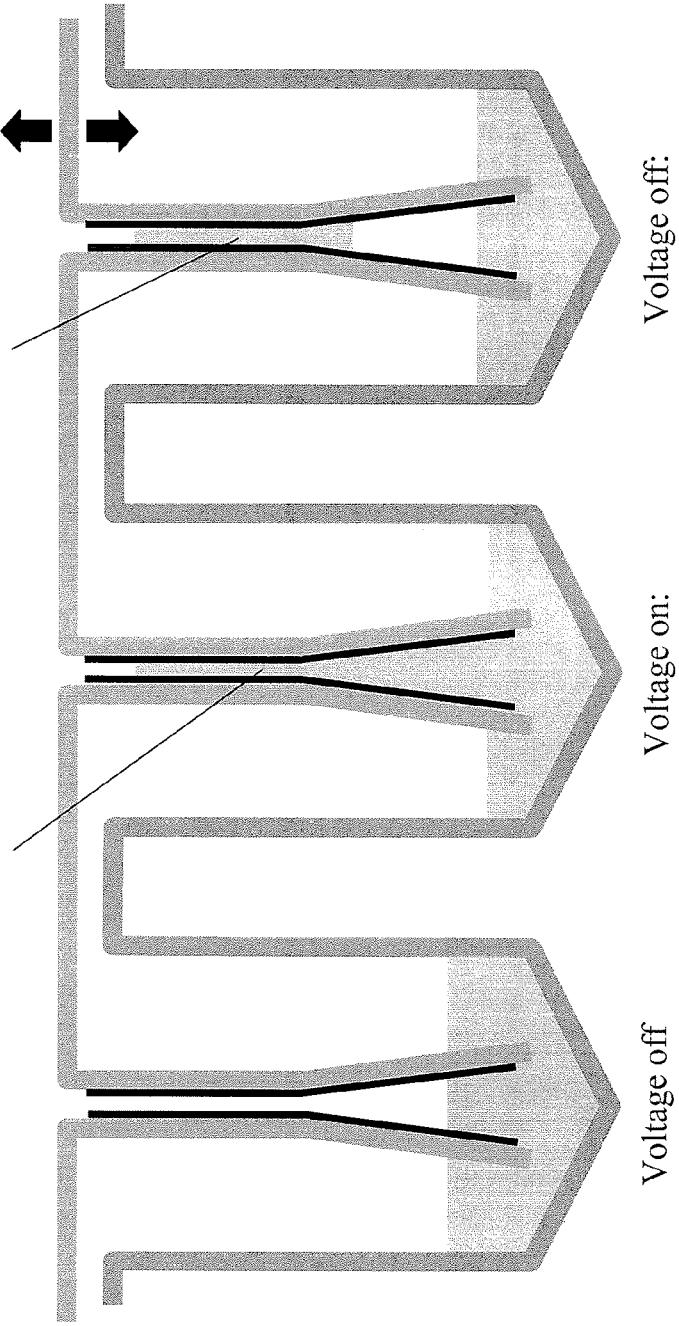
FIG. 28 shows a side cross sectional schematic view of the frequency-addressable, liquid-actuation apparatus illustrated in FIG. 27 as an aid in understanding the operation of the device.

An exemplary embodiment of the invention is directed to a method to change the location of a volume of a trapped working fluid sample in a well plate that utilizes a change in the frequency of an applied AC voltage to exploit both electrowetting and liquid dielectrophoresis as a microfluidic control strategy and a bifurcation mechanism by which liquid can be drawn out and then trapped. Reference is made to FIGS. 27 and 28.

FIG. 27 schematically shows a side sectional view of a frequency-driven, liquid-actuation apparatus 2700-1 for use in a fluid sample well plate array. The apparatus includes a removable support structure array 2730 comprising a plurality of electrode components 2731-2733 that are configured in a manner for removable insertion into the wells of a typical well plate array 2740. Each electrode component includes an individually-electrically-addressable pair of opposing, dielectric-coated electrodes 2705 disposed on a surface thereof. The electrode pairs can be parallel or, convergent, as illustrated, to take advantage of a known bifurcation effect on electrohydrostatic equilibria for insulative liquids. In the exemplary illustrated aspect, the electrodes form a spatially-varying gap that is wider at a distal region of the structure than at a proximal region. A variable-frequency AC voltage source is operatively coupled to the pairs of electrodes; and a programmable controller is coupled to the variable-frequency AC voltage source to individually address each of the pairs of electrodes. Because electrodes for each extraction structure are individually addressable, liquid can be extracted from any combination of well-plates by either direct operator control or programmable microprocessor that controls voltage (amplitude & frequency) supplied to electrode pairs.

Consistent with the various embodiments of the invention described herein above, the dielectric coating 2706 on the electrodes may vary spatially as a function of electrode gap spacing to enhance the frequency-addressable operation of the apparatus. The electrode pairs must be coated with an appropriately thin layer of dielectric to prevent direct liquid/metal contact. In various aspects, the electrodes may be flat or be made to conform to opposed arcs of a cylinder or conic section, according to the design of the extraction plate.

According to an exemplary aspect, the removable support structure array 2730 will be configured to be disposable in standard well plate arrays. It may be made from a disposable, molded plastic piece and should be designed to achieve modestly accurate registration (~0.5 mm) with standard well-plates.

In operation this embodiment exploits the bifurcation phenomenon associated with electrohydrostatic equilibrium when spatially-varying electrode structures are employed. As illustrated in FIGS. 27 and 28, the removable array structure is depicted as inserted into the well plate and is used to extract liquid 2710, such as supernatant or analyte as required, from any well or wells. In these structures, the liquid is first drawn upward as the voltage is increased and then some or all of it is trapped in the top section by the bifurcation phenomenon when the voltage is decreased. The volume of liquid extracted depends on the design of the electrodes and may be adjusted by controlling either voltage or frequency or both. This hysteretic behavior is frequency-dependent, with the EWOD and liquid DEP limits at low and high frequency, respectively. This frequency dependence may be exploited to enable adjustment of the amount of liquid extracted from the well. Thus electric field frequency can be used to move the volume of trapped samples because the location of the pinch-off bifurcation is a function of frequency. A variety of working liquids can be used such as the aqueous analytes and wash solutions typically specified in the protocols and analysis techniques common to microbiology, biochemistry, genetic research, etc.

Figure 29:
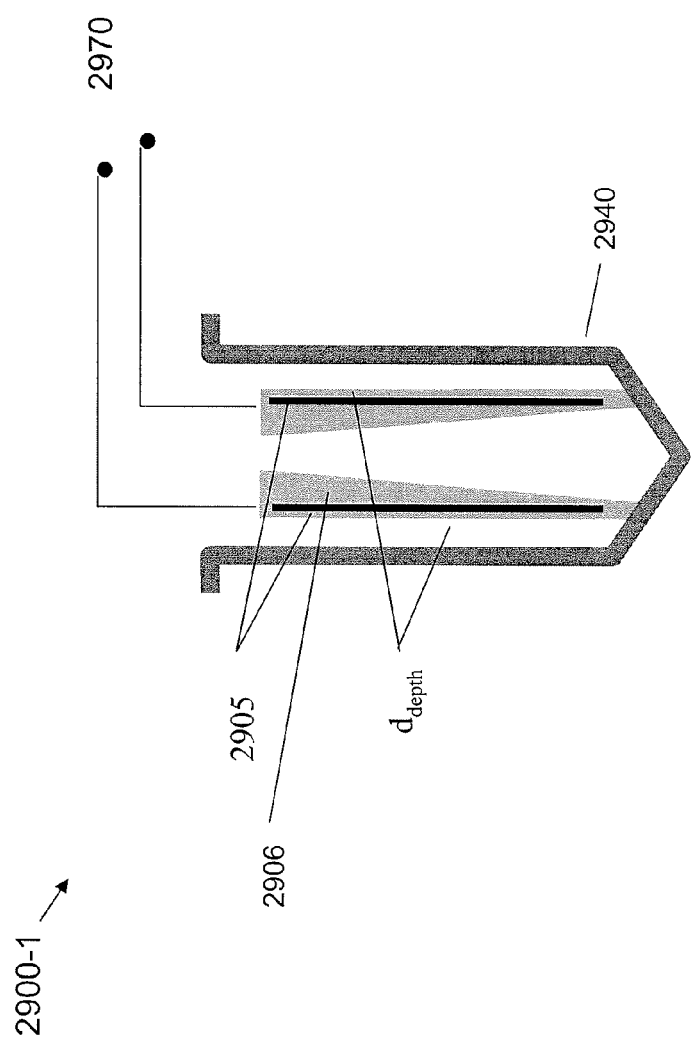
FIG. 29 is a side cross sectional schematic view of a frequency-addressable, smart well plate geometry according to an exemplary embodiment of the invention.
Figure 30:
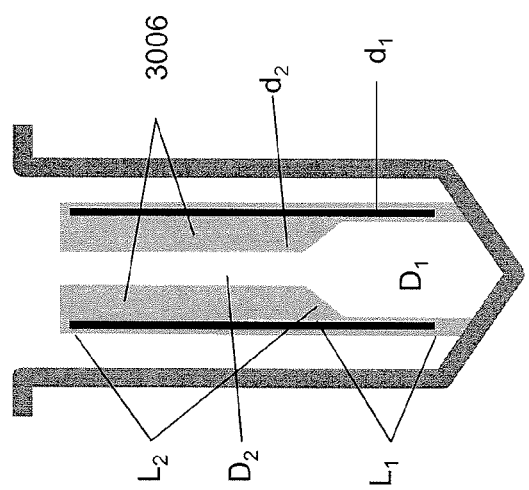
FIG. 30 is a side cross sectional schematic view of an alternative frequency-addressable, smart well plate geometry according to an exemplary embodiment of the invention.

FIGS. 29 and 30 show schematic side views of two different geometries 2800-1, 2900-1, for a single well of a smart well plate array for voltage-controlled extraction of precise volumes of supernatant, waste analyte, or wash solution 3110 as shown in FIG. 31. According to this embodiment, a frequency-addressable well plate array includes an arrayed plurality of cylindrical wells each having a surrounding side wall and a bottom, a single exemplary aspect of one of which is shown as 2940 in FIG. 29. Each well includes an individually-electrically-addressable pair of opposing, dielectric-coated electrodes 2905 shown embedded in dielectric forms 2906. Each dielectric-coated electrode has a dielectric coating thickness, $d_{depth}$, that varies smoothly along the electrode length, and which forms a smooth, spatially-varying electrode gap having a width, $D_{depth}$, along the depth of the well. A variable-frequency AC voltage source is operatively coupled to the pairs of electrodes and a programmable controller coupled to the variable-frequency AC voltage source and adapted to individually address each of the pairs of electrodes is provided at 2970.

FIG. 30 illustrates an alternative aspect 3000-1 of the electrode/well structure of FIG. 29 wherein the dielectric forms 3006 vary spatially in a step-wise manner; i.e., in a wider gap region $D_1$ over the electrode length $L_1$ the electrode thickness is $d_1$; and, in a narrower gap region $D_2$ over the electrode length $L_2$ the electrode thickness is $d_2$, where $D_2 \ll D_1$, $d_2 \gg d_1$, and the volume of regions $D_1$ and $D_2$ are approximately equal. Other parameter constraints as described herein above also apply.

These electrodes structures of 2900-1 and 3000-1 are permanently mounted so as to remain parallel within the individual wells. Typical wells have a circular cross-section and one dielectric-coated electrode pair is inserted into each well. The construction of the electrodes should be such that injection of liquid analyte into the well, e.g., by a micropipette, is not impeded and further that the liquid freely distributes itself at the bottom of the well.

FIGS. 31(a-d) illustrate the basic operational steps for the separation of supernatant or wash solution from pellets 3111 in individual wells after a centrifuge operation performed on a well plate. FIG. 31a shows the well containing supernatant or wash solution 3110 with a cell mass or pellet 3111 at the bottom. In FIG. 31b, the voltage is turned on at a selected higher frequency and the liquid is drawn up between the electrodes by the EWOD-based force. In FIG. 31c, reduction or removal of voltage results in bifurcation of the hydrostatic equilibrium, which traps the liquid in the narrow gap region. In FIG. 31d, the separated liquid is removed from the narrow region, leaving the concentrated cell mass/pellet at the bottom of the well. Electric field frequency can be used to move the volume of trapped samples, because the location of the pinch-off bifurcation is a function of frequency.

Having thus described the various embodiments of the invention, it will be apparent to those skilled in the art that the foregoing detailed disclosure is presented by way of example only and thus is not limiting. Various alterations, improvements and modifications recognized by those skilled in the art, though not expressly stated herein, may be made and are intended to be within the spirit and scope of the claimed invention. Additionally, the recited order of processing elements or sequences, or the use of numbers, letters, or other designations, is not intended to limit the claimed processes to any order except as may be specified in the claims. Accordingly, embodiments of the invention are limited only by the following claims and equivalents thereto.

We claim:

1. A frequency-addressable, bistable, fluid-actuation apparatus, comprising:
a pair of opposing, dielectric-coated electrodes, wherein one of the electrodes has a dielectric coating of uniform thickness, $d_0$, further wherein the other electrode has a dielectric coating of thickness $d_1$ over a length $L_1$ forming a first gap region therebetween having a spacing $D_1$, and a dielectric coating of thickness $d_2$ over a length $L_2$ forming a second gap region therebetween having a spacing $D_2$ and contiguous with the first gap region, wherein $d_0 \leq d_1$, $d_2 \gg d_1$, $D_2 \ll D_1$, and $(d_1+d_0)D_1 \ll (d_2+d_0)D_2$, further wherein the first and second gap regions are dimensioned to hold a volume of a working fluid substantially in one or the other of the gap regions via a capillary mechanism; and
a multiple-frequency AC voltage source operatively coupled to the electrodes.

2. The apparatus of claim 1, wherein $d_1$ is in the range between about 0.3 microns (μ) and 1μ, $d_2$ is in the range between about 1μ and 10μ, $D_1$ is in the range between about 250μ and 800μ; and $D_2$ is in the range between about 50μ and 100μ.

3. The apparatus of claim 1, wherein the dielectric coating has a dielectric constant $\kappa_d$ in a range between about 2 to 100.

4. The apparatus of claim 1, wherein the electrodes are transparent.

5. The apparatus of claim 1, further comprising a volume of a working fluid disposed in one of the first gap region and the second gap region via a capillary force and movable to one of the second gap region and the first gap region, respectively, via a dielectrophoresis-based (DEP) electromechanical force exerted on the working fluid by a predetermined high-frequency value of the applied AC voltage and, via an electrowetting-on-dielectric-based (EWOD) electromechanical force exerted on the working fluid by a predetermined low frequency value of the AC voltage, respectively, wherein the frequency is in the range between 50 to 5000 Hertz (Hz).

6. The apparatus of claim 1, wherein the working fluid (wf) is a semi-insulative liquid having a conductivity $\sigma_{wf}$ in a range between about $10^{-4}$ to $10^{-1}$ Siemens per meter (S/m) and a relative permittivity $\kappa_{wf}$ between about 10 to 100.

7. The apparatus of claim 6, comprising a second fluid consisting of an insulating material having a conductivity n less than about $10^{-10}$ S/m.

8. The apparatus of claim 6, wherein the working fluid includes a colorant.

9. The apparatus of claim 7, wherein the second fluid includes a colorant.

10. The apparatus of claim 7, wherein either one of the fluids is immiscible in the other.

11. A frequency-addressable fluidic-actuation apparatus, comprising:
   a first substrate portion and an opposing second substrate portion;
   a first electrode having a dielectric coating, integrally associated with the first substrate portion and a second electrode having a dielectric coating, integrally associated with the second substrate portion, wherein there is a spatially-varying gap region defined by the spacing between the electrodes; and
   a multiple-frequency AC voltage source operatively coupled to the electrodes.

12. The apparatus of claim 11, wherein one of the electrodes has a dielectric coating of uniform thickness, $d_0$, further wherein the other electrode has a dielectric coating of thickness $d_1$ over a length $L_1$ forming a first gap region therebetween having a spacing $D_1$, and, at least, a dielectric coating of thickness $d_2$ over a length $L_2$ forming a second gap region therebetween having a spacing $D_2$ and contiguous with the first gap region, wherein $d_0 \leq d_1$, $d_2 \gg d_1$, $D_2 \ll D_1$, and $(d_1+d_0)D \ll (d_2+d_0)D_2$, further wherein the first and the at least second gap regions are dimensioned to hold a volume of a working fluid substantially in one or the other of the gap regions via a capillary mechanism.

13. The apparatus of claim 12, wherein $d_1$ is in the range between about 0.3 microns (μ) and 1μ, $d_2$ is in the range between about 1μ and 10μ, $D_1$ is in the range between about 250μ and 800μ; and $D_2$ is in the range between about 50μ and 100μ.

14. The apparatus of claim 11, wherein the dielectric coating has a dielectric constant $\kappa_d$ in a range between about 2 to 100.

15. The apparatus of claim 11, wherein the electrodes are transparent.

16. The apparatus of claim 12, further comprising a volume of a working fluid disposed in one of the first gap region and the second gap region via a capillary force and movable to one of the second gap region and the first gap region, respectively, via a dielectrophoresis-based (DEP) electromechanical force exerted on the working fluid by a predetermined high-frequency value of the applied AC voltage and, via an electrowetting-on-dielectric-based (EWOD) electromechanical force exerted on the working fluid by a predetermined low frequency value of the AC voltage, respectively, wherein the frequency is in the range between 50 to 5000 Hertz (Hz).

17. The apparatus of claim 16, wherein the working fluid (wf) is a semi-insulative liquid having a conductivity $\sigma_{wf}$ in a range between about $10^{-4}$ to $10^{-1}$ Siemens per meter (S/m) and a relative permittivity $\kappa_{wf}$ between about 10 to 100.

18. The apparatus of claim 11, wherein the gap region has a thickness $D(x)$ that varies smoothly from a wider gap thickness to a narrower gap thickness over a length x of the apparatus, further wherein the dielectric coating on each of the electrodes has a thickness $d(x)$ that varies smoothly from a thinner value in the wider gap region to a thicker value in the narrower gap region, further wherein the gap is dimensioned to hold a volume of a working fluid via a capillary mechanism.

19. The apparatus of claim 18, wherein $d(x)$ smoothly varies in a range between about 0.3μ to about 10μ and $D(x)$ smoothly varies in a range between about 800μ to about 50μ.

20. The apparatus of claim 12, wherein the first gap region and the at least the second gap region comprise a plurality of gap regions, all of which have substantially equal volume capacities.

21. The apparatus of claim 11, wherein the substrate portions are made of one of glass and a polymer material.

22. The apparatus of claim 18, wherein the dielectric coating has a dielectric constant $\kappa_d$ in the range between about 2 to 100.

23. The apparatus of claim 18, wherein the electrodes are transparent.

24. The apparatus of claim 18, further comprising a volume of a working fluid disposed in a portion of the gap region via a capillary force and movable from the wider gap region to the narrower gap region via a dielectrophoresis-based (DEP) electromechanical force exerted on the working fluid by a predetermined high-frequency value of the applied AC voltage and, from the narrower gap region to the wider gap region via an electrowetting-on-dielectric-based (EWOD) electromechanical force exerted on the working fluid by a predetermined low frequency value of the AC voltage, respectively, wherein the frequency is in the range between 50 to 5000 Hertz (Hz).

25. The apparatus of claim 12, wherein the apparatus is a pixel-based display device.

26. The apparatus of claim 11, further comprising a working fluid supply source coupled to the apparatus.

27. The apparatus of claim 12, further comprising a third gap region fluidly connected to the second gap region, wherein the third gap region has a gap spacing $D_3$ that is greater than the gap spacing $D_2$, further wherein the first gap region, the second gap region, and the third gap region have substantially equal volume capacities.

28. The apparatus of claim 27, wherein $D_3$ is approximately equal to $D_1$.

29. The apparatus of claim 28, wherein the dielectric coating on the first and the second electrodes has a thickness $d_1$ over the gap region $D_1$, the dielectric coating on the first and second electrodes has a thickness $d_2$ over the gap region $D_2$, and the dielectric coating on the first and second electrodes has a thickness $d_3$ over the gap region $D_3$, further wherein $d_1$ and $d_3$ are substantially equal and are less than $d_2$.

30. The apparatus of claim 29, wherein the apparatus has an axial dimension $L_1$ over a the gap region $D_1$, the apparatus has an axial dimension $L_2$ over the gap region $D_2$, and the apparatus has an axial dimension $L_3$ over the gap region $D_3$, further wherein $L_1 < L_2$, $L_3 < L_2$.

31. The apparatus of claim 30, wherein the gap thickness smoothly varies between the values $D_1$ and $D_2$ and between $D_2$ and $D_3$.

32. The apparatus of claim 31, wherein dielectric coating thickness smoothly varies between the values $d_1$ and $d_2$ and between $d_2$ and $d_3$.

33. The apparatus of claim 29, wherein $d_1$ is in the range between about 0.3μ and $d_2$ is in the range between about 1μ and 10μ, $d_3$ is in the range between about 0.3μ and 1μ, $D_1$ is in the range between about 250μ and 800μ, and $D_2$ is in the range between about 50μ and 100μ.

34. The apparatus of claim 27, wherein an applied AC voltage has a frequency f in the range between about 50 to 5000 cycles per second (Hz), further wherein an electrowetting-on-dielectric-based (EWOD) electromechanical force is exerted on the working fluid over a low-frequency range of the applied AC voltage and a dielectrophoresis-based (DEP) electromechanical force is exerted on the working fluid over a high-frequency range of the applied AC voltage, further wherein there is a transition frequency $f_T$ in a sub-range of f below which and above which one and the other of the electromechanical force mechanism is actuated.

35. The apparatus of claim 27, further comprising a working fluid supply source coupled to the apparatus.

36. The apparatus of claim 27, wherein the apparatus is a controlled-volume fluid dispenser device.

37. A frequency-addressable, bistable microfluidic actuation apparatus, comprising:
- a first, planar substrate portion having an interior surface;
- a first electrode having a dielectric coating of thickness $d_0$ integrally associated with the interior surface of the first substrate portion;
- a second substrate portion having a planar interior surface with an array of wells extending into the planar interior surface, disposed in spaced relation to the first substrate portion;
- a second electrode integrally associated with the second substrate portion, having a first dielectric coating of thickness $d_1$ associated with a bottom interior surface of each of the wells and a second dielectric coating of thickness $d_2$ associated with the planar interior surface of the second substrate portion, wherein there is narrower gap region having a spacing $D_2$ defined by the spacing between the respective, opposed planar interior surfaces of the first and second substrate/electrode portions and a plurality of thicker gap regions having a spacing $D_1$ between the first electrode surface and the second electrode-coated bottom interior surface of each of the wells; and
- a multiple-frequency AC voltage source operatively coupled to the electrodes.

38. The apparatus of claim 37, wherein $d_0 \leq d_1$, $d_2 \gg d_1$ and $D_2 \ll D_1$.

39. The apparatus of claim 37, further comprising a volume of working fluid that substantially resides only in one of the narrower gap region and the plurality of the wider gap regions via a capillary force, and which is movable between the wider gap regions to the narrower gap region via a dielectrophoresis-based (DEP) electromechanical force exerted on the working fluid by a predetermined high-frequency value of the applied AC voltage and, between the narrower gap region to the wider gap regions via an electrowetting-on-dielectric-based (EWOD) electromechanical force exerted on the working fluid by a predetermined low frequency value of the AC voltage, respectively, wherein the frequency is in the range between 50 to 5000 Hertz (Hz), further wherein the working fluid (wf) is a semi-insulative liquid having a conductivity $\sigma_{wf}$ in a range between about $10^{-4}$ to $10^{-1}$ Siemens per meter (S/m) and a relative permittivity $\kappa_{wf}$ between about 10 to 100.

40. The apparatus of claim 37, wherein the substrate portions are made of one of glass and a polymer material.

41. The apparatus of claim 37, wherein $d_1$ is in the range between about 0.3 microns ($\mu$) and $d_2$ is in the range between about 1$\mu$ and 10$\mu$, $D_1$ is in the range between about 250$\mu$ and 800$\mu$; and $D_2$ is in the range between about 50$\mu$ and 100$\mu$.

42. The apparatus of claim 37, wherein the dielectric coating has a dielectric constant $\kappa_d$ in a range between about 2 to 100.

43. The apparatus of claim 37, wherein the electrodes are transparent.

44. The apparatus of claim 37, wherein the apparatus is an array fluid dispenser device.

45. The apparatus of claim 37, further comprising a working fluid supply source coupled to the apparatus.

46. A frequency-addressable, bistable electrooptic coupling apparatus, comprising:
- a first optical fiber including a core and a cladding and having a first face surface at an end thereof, wherein at least the first face surface includes a transparent electrode having a dielectric coating of thickness $d_1$;
- a second optical fiber including a core and a cladding and having a second face surface at an end thereof, disposed in face-to-face axial alignment with the first optical fiber and separated therefrom by a gap distance $D_1$, wherein the second face surface includes a transparent electrode having a dielectric coating of thickness, $d_1$, further wherein at least a portion of the optical fiber cladding, adjacent the second face surface, includes a circumferential electrode having a dielectric coating of thickness, $d_2$;
- a cylindrical collar electrode concentrically disposed about the first and second optical fibers and having a dielectric coating on an interior surface thereof, wherein an annular gap between the inside surface of the collar and the second optical fiber has a gap distance, $D_2$;
- a first fluidic well formed by the gap distance $D_1$ and adapted to removeably contain a working fluid, and a second fluidic well formed by the gap distance $D_2$, fluidly connected to the first fluidic well and adapted to removeably contain the working fluid; and
- a multiple-frequency AC voltage source operatively coupled to the peripheral second fiber electrode and the collar electrode.

47. The apparatus of claim 46, wherein the first fluidic well and the second fluidic well have substantially equal volume capacities.

48. The apparatus of claim 46, wherein either $D_1 \gg D_2$ and $d_1 \ll d_2$, or $D_1 \ll D_2$ and $d_1 \gg d_2$.

49. The apparatus of claim 46, wherein a volume of working fluid substantially resides only in one of the first fluidic well and the second fluidic well via a capillary force, and which is movable between the first fluidic well to the second fluidic well via a dielectrophoresis-based (DEP) electromechanical force exerted on the working fluid by a predetermined high-frequency value of the applied AC voltage and, between the second fluidic well and the first fluidic well via an electrowetting-on-dielectric-based (EWOD) electromechanical force exerted on the working fluid by a predetermined low frequency value of the AC voltage, respectively, wherein the frequency is in the range between 50 to 5000 Hertz (Hz), further wherein the working fluid (wf) is a semi-insulative liquid having a conductivity $\sigma_{wf}$ in a range between about $10^{-4}$ to $10^{-1}$ Siemens per meter (S/m) and a relative permittivity $\kappa_{wf}$ between about 10 to 100.

50. A frequency-addressable, analog, fluid-position control apparatus, comprising:
- a first substrate portion and an opposing second substrate portion;
- a first electrode having a dielectric coating, integrally associated with the first substrate portion and a second electrode having a dielectric coating, integrally associated with the second substrate portion, wherein there is a gap having a volume $V_G$ defined by the spacing of the respective, opposed substrate/electrode portions, further wherein the gap has a spacing $D(x)$ and the dielectric coatings have a thickness $d(x)$ that vary continuously in an inverse manner along a lateral dimension, x, of the apparatus; and
- a variable-frequency AC voltage source operatively coupled to the electrodes,
- wherein a working fluid of fixed volume $V < V_G$, can be made to move from a wider portion of the gap to narrower portion of the gap by application of the AC voltage at a higher frequency $f_a$ and, can be made to move from a narrower portion of the gap to a wider portion of the gap by application of the AC voltage at a lower frequency $f_b$, where $f_a > f_b$.

51. The apparatus of claim 50, wherein the gap thickness smoothly varies two dimensions.

52. The apparatus of claim 50, further comprising a chamber disposed along a region of the gap, wherein said chamber has a chamber gap spacing, $D_c(x)$, that is greater than $D(x)$, and a volume $V_c < V$.

53. The apparatus of claim 52, wherein the dielectric coating within the chamber has a thickness $d_c(x)$ that is less than $d(x)$ in a region immediately adjacent the chamber.

54. The apparatus of claim 53, wherein the apparatus is a controlled-volume fluid dispenser device.

55. The apparatus of claim 50, wherein $d(x)$ smoothly varies in a range between about $0.3\mu$ to about $10\mu$ and $D(x)$ correspondingly smoothly varies in a range between about $800\mu$ to about $50\mu$.

56. The apparatus of claim 50, wherein the working fluid (wf) is a semi-insulative liquid having a conductivity $\sigma_{wf}$ in a range between about $10^{-4}$ to $10^{-1}$ Siemens per meter (S/m) and a relative permittivity $\kappa_{wf}$ between about 10 to 100.

57. A frequency-addressable, analog, electrooptical control apparatus, comprising:
 a cylindrical optical waveguide having an outer surface;
 a tube disposed about at least a portion of the outer surface of the waveguide, having an inner surface and forming an annular gap between the outer surface of the waveguide and the inner surface of the tube, wherein the inner surface of the tube has a continuous taper along a length L of the waveguide such that the gap has a variable thickness $D(x)$ and a volume $V_G$ over the length L, further wherein at least the portion of the outer surface of the waveguide includes an integral inner electrode having a dielectric coating and at least the portion of the inner surface of the tube includes an integral outer electrode having a dielectric coating, further wherein the dielectric coating has a thickness, $d(x)$, that varies continuously in an inverse manner to $D(x)$ along L; and
 a variable-frequency AC voltage source operatively coupled to the electrodes,
 wherein a working fluid of fixed volume $V < V_G$ can be made to move from a wider portion of the gap to narrower portion of the gap by application of the AC voltage at a higher frequency $f_a$ and, can be made to move from a narrower portion of the gap to a wider portion of the gap by application of the AC voltage at a lower frequency $f_b$, where $f_a > f_b$.

58. The apparatus of claim 57, wherein $d(x)$ smoothly varies in a range between about $0.3\mu$ to about $10\mu$ and $D(x)$ correspondingly smoothly varies in a range between about $800\mu$ to about $50\mu$.

59. The apparatus of claim 57, wherein the working fluid (wf) is a semi-insulative liquid having a conductivity $\sigma_{wf}$ in a range between about $10^{-4}$ to $10^{-1}$ Siemens per meter (S/m) and a relative permittivity $\kappa_{wf}$ between about 10 to 100.

60. The apparatus of claim 57, wherein the apparatus is an electrooptic attenuator.

61. The apparatus of claim 57, wherein the apparatus is an electrooptic tuner.

62. A frequency-addressable, liquid-actuation apparatus for use in a fluid sample well plate array, comprising:
 a removable support structure array comprising a plurality of portions configured in a manner for removable insertion into the wells of a well plate array, wherein each portion includes an individually-electrically-addressable pair of opposing, dielectric-coated electrodes disposed on a surface thereof; further wherein each portion has a spatially-varying gap between the opposed electrodes;
 a multiple-frequency AC voltage source operatively coupled to the pairs of electrodes; and
 a programmable controller coupled to the variable-frequency AC voltage source and adapted to individually address each of the pairs of electrodes.

63. The apparatus of claim 62, comprising an n×m support structure array, wherein $n \geq 1$ and $m \geq 2$.

64. The apparatus of claim 62, wherein the spatially-varying gap is wider at a distal region of the portion than at a proximal region of the portion.

65. The apparatus of claim 64, wherein the spatially-varying gap varies continuously over the portion between the distal region and the proximal region.

66. The apparatus of claim 64, wherein the spatially-varying gap varies in a step-wise manner over the portion between the distal region and the proximal region.

67. The apparatus of claim 62, wherein each of the electrode pairs is disposed on an exterior surface of the portion.

68. The apparatus of claim 62, wherein each of the electrode pairs is disposed on an interior surface of the portion.

69. The apparatus of claim 62, wherein each dielectric-coated electrode has a uniform dielectric coating thickness.

70. The apparatus of claim 64, wherein each dielectric-coated electrode has a spatially-varying dielectric coating thickness between the distal region of the portion and the proximal region of the portion.

71. The apparatus of claim 70, wherein the dielectric coating thickness varies continuously between the distal region of the portion and the proximal region of the portion.

72. The apparatus of claim 70, wherein the dielectric coating thickness varies in a step-wise manner between the distal region of the portion and the proximal region of the portion.

73. The apparatus of claim 70, wherein the dielectric coating thickness is thicker at the proximal region of the portion than at the distal region of the portion.

74. A frequency-addressable, liquid-actuation, integrated well plate array, comprising:
 an arrayed plurality of cylindrical wells each having a surrounding side wall and a bottom;
 an individually-electrically-addressable pair of opposing, dielectric-coated electrodes disposed on at least a portion of the sidewall of each well and forming a gap having a width, $D_{depth}$, along the depth of the well defined by the well volume immediately adjacent the electrodes; wherein each dielectric-coated electrode has a dielectric coating thickness, $d_{depth}$, that varies along the electrode length such that the gap width varies over the well depth; and
 a multiple-frequency AC voltage source operatively coupled to the pairs of electrodes.

75. The well plate array of claim 74, wherein $d_{depth}$ varies continuously along the length of the electrode such that $d_{depth}$ at the top of the well is greater than $d_{depth}$ at the bottom of the well and thus $D_{depth}$ at the top of the well is less than $D_{depth}$ at the bottom of the well.

76. The well plate array of claim 74, wherein $d_{depth}$ varies in a step-wise manner along the length of the electrode such that the dielectric coating has a first constant thickness $d_{depth\ 1}$ over an upper well depth portion and a second constant thickness $d_{depth\ 2}$ over a lower well depth portion, wherein $d_{depth\ 1} > d_{depth\ 2}$ and thus $D_{depth}$ in the upper well depth portion is less than $D_{depth}$ in the lower well depth portion.

77. The well plate array of claim 76, wherein $D_{depth}$ defines a working fluid volume V where V in the upper well depth portion is equal to V in the lower well depth portion.

78. A method for controlling the position of a semi-insulative, working-fluid mass occupying at least a portion of a spatially-varying gap formed by an opposing pair of dielectrically-coated electrodes in an apparatus, comprising:

applying at least one of a) a fixed duration of a nominal, substantially constant AC voltage to the pair of electrodes at a frequency in a lower frequency range to exert an electrowetting-on-dielectric (EWOD)-based force on the fluid occupying a smaller gap region of the spatially-varying gap and, b) a fixed duration of a nominal, substantially constant AC voltage to the pair of electrodes at a frequency in a higher frequency range to exert a dielectrophoresis (DEP)-based force on the fluid occupying a larger gap region of the spatially-varying gap;

at least one of c) changing the frequency of the AC voltage from the frequency in the lower frequency range to the frequency in the higher frequency range to move the fluid from the larger gap region of the spatially-varying gap to the smaller gap region of the spatially-varying gap and d) changing the frequency of the AC voltage from the frequency in the higher frequency range to the frequency in the lower frequency range to move the fluid from the smaller gap region of the spatially-varying gap to the larger gap region of the spatially-varying gap.

79. The method of claim 78, further comprising maintaining the fluid in one of the larger gap region and the smaller gap region of the spatially-varying gap via capillary action with no change in the frequency of the AC voltage.

80. The method of claim 78, wherein the step of applying a fixed duration of a nominal, substantially constant AC voltage comprises applying a tone burst of the AC voltage at one of the lower frequency and the higher frequency.

81. The method of claim 80, wherein the step of changing the frequency of the AC voltage comprises alternately applying a tone burst of the AC voltage at one of the lower frequency and the higher frequency.

82. The method of claim 80, further comprising changing the frequency of the AC voltage between the lower frequency and the higher frequency in a substantially continuous, monotonic manner.

83. A frequency-addressable method for bifurcating a portion of a semi-insulative working-fluid mass occupying at least a portion of a spatially-varying gap formed by an opposing pair of dielectrically-coated electrodes in an apparatus, comprising:

providing a volume of the working fluid in a first larger gap region of the spatially-varying gap, that is separated from a second larger gap region by an intermediate smaller gap region, with a nominal AC voltage at a lower frequency $f_a$ such that an electrowetting-on-dielectric (EWOD)-based force is exerted on the fluid;

moving the volume of fluid into the smaller gap region by applying a fixed-duration of the nominal AC voltage at a higher frequency $f_b$ such that a dielectrophoresis (DEP)-based force is exerted on the fluid;

bifurcating a portion of the volume of the fluid and moving the portion of the fluid to the second larger gap region, and returning a remaining portion of the fluid to the first larger gap region, by applying a fixed-duration of the nominal AC voltage at the lower frequency $f_a$.

84. The method of claim 83, wherein the apparatus has an open end adjacent a distal end of the second larger gap region, and further comprising dispensing the bifurcated portion of the fluid volume out of the open end.

85. A frequency-addressable, bistable, fluid-actuation apparatus, comprising:

a first substrate portion and an opposing second substrate portion;

a first electrode having a dielectric coating of thickness $d_2$, integrally associated with the first substrate portion and a split electrode component having a dielectric coating of thickness $d_1$, integrally associated with the second substrate portion, wherein the split electrode component includes a second electrode and a third electrode physically separated from the second electrode, wherein there is a spatially-varying gap defined by the spacing between the first electrode and the split electrode component;

an external capacitor having a capacitance $C_0$ connected to the third electrode; and a multiple-frequency AC voltage source operatively coupled to the electrodes.

86. The apparatus of claim 85, wherein the spatially-varying gap has a first gap region having a gap thickness $D_1$ over a length $L_1$ and a second gap region having a gap thickness $D_2$ over a length $L_2$, contiguous with $D_1$, wherein $D_2 \ll D_1$, further wherein the first and the second gap regions have approximately equal volume capacities.

87. The apparatus of claim 85, wherein the dielectric coating has a dielectric constant $\kappa_d$ in a range between about 2 to 100.

88. The apparatus of claim 85, wherein the electrodes are transparent.

89. The apparatus of claim 86, further comprising a volume of a working fluid disposed in at least a portion of one of the first gap region and the second gap region via a capillary force and movable from the first gap region to the second gap region via a dielectrophoresis-based (DEP) electromechanical force exerted on the working fluid by a predetermined high-frequency value of the applied AC voltage and, from the second gap region to the first gap region via an electrowetting-on-dielectric-based (EWOD) electromechanical force exerted on the working fluid by a predetermined low frequency value of the AC voltage, respectively, wherein the frequency is in the range between 50 to 5000 Hertz (Hz).

90. The apparatus of claim 89, wherein the working fluid (wf) is a semi-insulative liquid having a conductivity $\sigma_{wf}$ in a range between about $10^{-4}$ to $10^{-1}$ Siemens per meter (S/m) and a relative permittivity $\kappa_{wf}$ between about 10 to 100.

91. The apparatus of claim 89, wherein the volume of the working fluid is in the range between about 100% to 140% of the volume capacity of one of the first and the second gap regions.

92. The apparatus of claim 85, wherein $2\text{E-}12\text{ F} \leq C_0 \leq 4\text{E-}9\text{ F}$.

93. The apparatus of claim 85, wherein $1\text{E-}12 \leq C_0 \leq 1\text{E-}9\text{ F}$.

94. The apparatus of claim 85, wherein $5\text{E-}7 \leq d_1 \leq 8\text{E-}6$ meters.

* * * * *